US012809944B2

(12) United States Patent
Jin et al.

(10) Patent No.: US 12,809,944 B2
(45) Date of Patent: Nov. 24, 2026

(54) RETRIEVAL METHOD, INDEX CONSTRUCTION METHOD, AND RELATED DEVICE

(71) Applicant: Huawei Technologies Co., Ltd., Shenzhen (CN)

(72) Inventors: Zhao Jin, Beijing (CN); Yuanyi Ji, Edinburgh (GB); Lanxin Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 999 days.

(21) Appl. No.: 18/148,655

(22) Filed: Dec. 30, 2022

(65) Prior Publication Data

US 2023/0144571 A1 May 11, 2023

Related U.S. Application Data

(63) Continuation of application No. PCT/CN2021/103400, filed on Jun. 30, 2021.

(30) Foreign Application Priority Data

Jun. 30, 2020 (CN) ......................... 202010617806.0

(51) Int. Cl.
*G06F 18/25* (2023.01)
*G06F 16/22* (2019.01)

(52) U.S. Cl.
CPC ............ *G06F 18/256* (2023.01); *G06F 16/22* (2019.01)

(58) Field of Classification Search
CPC ....... G06F 18/256; G06F 16/22; G06F 16/953
See application file for complete search history.

(56) References Cited

U.S. PATENT DOCUMENTS 8,972,410 B2 3/2015 Eshghi et al.
2013/0039569 A1* 2/2013 Kashiwagi .......... G06F 18/2135 382/154

(Continued)

FOREIGN PATENT DOCUMENTS

CN 101859320 A 10/2010
CN 102426583 A 4/2012

(Continued)

OTHER PUBLICATIONS

Jegou, H., et al., "Product Quantization for Nearest Neighbor Search", IEEE Transactions on Pattern Analysis and Machine Intelligence, vol. 33, No. 1, Jan. 2011, 12 pages.

*Primary Examiner* — Grace Park
(74) *Attorney, Agent, or Firm* — Conley Rose, P.C.

(57) ABSTRACT

A retrieval method includes obtaining first data corresponding to a retrieval object, wherein the first data indicates M feature vectors of the retrieval object, wherein each feature vector of the retrieval object corresponds to one modality of the retrieval object, and wherein M is an integer greater than 1, and obtaining a correlation between a plurality of groups of object information and the retrieval information to output at least one group of retrieved object information, wherein each group of object information corresponds to M feature vectors in an index, wherein the M feature vectors of each group of object information are indicated by one group of second data, and wherein each feature vector of the object information corresponds to one modality of the object information.

20 Claims, 9 Drawing Sheets

(56) References Cited

U.S. PATENT DOCUMENTS

| | | | | |
|---|---|---|---|---|
| 2016/0217171 | A1* | 7/2016 | Arngren | G06F 16/2322 |
| 2016/0283858 | A1* | 9/2016 | Lin | G06N 20/00 |
| 2019/0251245 | A1* | 8/2019 | Kim | G06F 21/40 |

FOREIGN PATENT DOCUMENTS

| | | | | |
|---|---|---|---|---|
| CN | 103412937 | A | 11/2013 | |
| CN | 104298967 | A | 1/2015 | |
| CN | 104820718 | A | 8/2015 | |
| CN | 105138672 | A | 12/2015 | |
| CN | 109189969 | A | 1/2019 | |
| CN | 110209895 | A | 9/2019 | |
| CN | 110334237 | A | 10/2019 | |
| CN | 110674350 | A | 1/2020 | |
| CN | 110704655 | A | 1/2020 | |
| CN | 110825899 | A | 2/2020 | |
| CN | 110858232 | A | 3/2020 | |
| CN | 111026887 | A * | 4/2020 | G06F 16/438 |
| KR | 20190134920 | A | 12/2019 | |
| WO | 2020022956 | A1 | 1/2020 | |

* cited by examiner

RETRIEVAL METHOD, INDEX CONSTRUCTION METHOD, AND RELATED DEVICE

CROSS-REFERENCE TO RELATED APPLICATIONS

This is a continuation of International Patent Application No. PCT/CN2021/103400 filed on Jun. 30, 2021, which claims priority to Chinese Patent Application No. 202010617806.0 filed on Jun. 30, 2020. The disclosures of the aforementioned applications are hereby incorporated by reference in their entireties.

TECHNICAL FIELD

Embodiments of this disclosure relate to the field of artificial intelligence technologies, and in particular, to a retrieval method, an index construction method, and a related device.

BACKGROUND

With rapid development of artificial intelligence technologies, search engines have developed from single text retrieval into multi-modal intelligent retrieval. Multi-modal intelligent retrieval means retrieval performed by using a plurality of modalities. The modalities may be prices, seasons, styles, materials, and the like of clothes.

An index needs to be constructed before multi-modal retrieval is performed. Currently, an index construction method is to construct one index for each modality of a plurality of groups of object information. Specifically, assuming that each group of object information corresponds to three modalities, one feature vector may be constructed for each modality of each group of object information. Therefore, three feature vectors may be constructed for each group of object information. It is assumed that three feature vectors constructed for each group of object information are a feature vector A, a feature vector B, and a feature vector C. One index A1, one index B1 and one index C1 may be respectively constructed for feature vectors A, feature vectors B, and feature vectors C corresponding to the plurality of groups of object information.

In a retrieval process, similarly, one feature vector is constructed for each modality of a retrieval object. Assuming that the retrieval object also corresponds to three modalities, three feature vectors may be constructed for the retrieval object. It is assumed that the three feature vectors constructed for the retrieval object are a feature vector A2, a feature vector B2, and a feature vector C2, A2 and A correspond to a same modality, B2 and B correspond to a same modality, and C2 and C correspond to a same modality. During retrieval, the index A1 is searched for the feature vector A of the object information similar to the feature vector A2 of the retrieval object, the index B1 is searched for the feature vector B of the object information similar to the feature vector B2 of the retrieval object, and the index C1 is searched for the feature vector C of the object information similar to the feature vector C2 of the retrieval object. Finally, one group of object information is determined based on the retrieved feature vector A of the object information, the feature vector B of the object information, and the feature vector C of the object information.

In an existing multi-modal retrieval method, different indexes need to be retrieved for a plurality of times, resulting in a high retrieval delay.

SUMMARY

Embodiments of this disclosure provide a retrieval method and an index construction method, to reduce a retrieval delay.

According to a first aspect, an embodiment of this disclosure provides a retrieval method, including: obtaining first data corresponding to a retrieval object, where the first data indicates M feature vectors of the retrieval object, each feature vector of the retrieval object corresponds to one modality of the retrieval object, and M is an integer greater than 1. There may be a plurality of types of the first data, for example, may be a code, a text, or a symbol. A method for obtaining the first data may be related to the type of the first data.

The method further includes: obtaining a correlation between a plurality of groups of object information and the retrieval object based on the first data and a plurality of groups of second data in an index, to output at least one group of retrieved object information. A correlation between each group of object information in the at least one group of object information and the retrieval object is greater than a first threshold. Each group of object information in the index corresponds to M feature vectors. The M feature vectors corresponding to each group of object information are indicated by one group of second data. Each feature vector of the object information corresponds to one modality of the object information. The correlation may be indicated by using a plurality of methods. For example, the correlation may be indicated by a distance between vectors, or may be indicated by using a score.

In the index, the second data indicates the M feature vectors corresponding to the object information, and each feature vector of the object information corresponds to one modality. Therefore, compared with accessing one index corresponding to each modality, multi-modal retrieval of the retrieval object can be completed by accessing only one index. A retrieval delay can be reduced in this embodiment of this disclosure.

In an implementation, the first data includes N codes, where each code forming the first data indicates at least one feature vector of the retrieval object, and N is a positive integer. The second data includes N codes, and each code forming the second data indicates at least one feature vector of the object information.

Compared with directly using the M feature vectors of the retrieval object as the first data, using the N codes as the first data can reduce storage overheads. Similarly, compared with directly using the M feature vectors of the object information as the second data, using a second code as the second data can also reduce storage overheads.

In an implementation, the N codes forming the first data are in a one-to-one correspondence with the N codes forming the second data. In two corresponding codes, a modality corresponding to a feature vector of the retrieval object indicated by one code is the same as a modality corresponding to a feature vector of the object information indicated by the other code.

The N codes forming the first data are in the one-to-one correspondence with the N codes forming the second data, so that the correlation between the plurality of groups of object information and the retrieval object can be directly calculated based on the N codes forming the first data and the N codes forming the second data.

In an implementation, each of the N codes forming the first data indicates one feature vector of the retrieval object. The obtaining the first data corresponding to the retrieval object includes: separately encoding the M feature vectors of the retrieval object to obtain M codes, to form the first data, where M is equal to N. There are a plurality of methods for encoding the feature vector of the retrieval object. For example, a product quantization (PQ) algorithm may be used to encode the feature vector of the retrieval object whose element type is a numeric type.

In this implementation, the M feature vectors of the retrieval object are directly encoded separately, and the M feature vectors of the retrieval object do not need to be processed before encoding. This can simplify an encoding process.

In an implementation, the obtaining the first data corresponding to the retrieval object includes: combining a plurality of feature vectors with a same element type in the M feature vectors of the retrieval object into one feature vector, to convert the M feature vectors of the retrieval object into N feature vectors, where N is less than M. A plurality of feature vectors of the retrieval object whose element types are all enumeration types or Boolean types may be combined into one feature vector. Alternatively, a plurality of feature vectors of the retrieval object whose element types are all integer types, long integer types, floating point number types, or double-precision floating point number types may be combined into one feature vector of the retrieval object.

Assuming that there are P feature vectors with a same element type in the M feature vectors of the retrieval object, and P is an integer greater than 1, the combining the plurality of feature vectors of the retrieval object whose element types are the same in the M feature vectors of the retrieval object into one feature vector of the retrieval object includes: combining the P feature vectors of the retrieval object into one feature vector of the retrieval object, or combining some of the P feature vectors of the retrieval object into one feature vector of the retrieval object. There are a plurality of methods for combining the plurality of feature vectors of the retrieval object whose element types are the same into one feature vector of the retrieval object. For example, elements in the plurality of feature vectors of the retrieval object whose element types are the same may be directly permutated and combined, to obtain one feature vector of the retrieval object.

The N feature vectors of the retrieval object are separately encoded, to obtain the N codes, to form the first data. There are a plurality of methods for encoding the feature vector of the retrieval object. For example, the PQ algorithm may be used to encode the feature vector of the retrieval object whose element type is a numeric type.

The plurality of feature vectors with the same element type are combined into one feature vector of the retrieval object, and then encoding is performed. This can complete encoding of the plurality of feature vectors of the retrieval object at one time, improving encoding efficiency.

In an implementation, the combining the plurality of feature vectors of the retrieval object whose element types are the same in the M feature vectors of the retrieval object into one feature vector of the retrieval object includes: normalizing the plurality of feature vectors of the retrieval object whose element types are the same in the M feature vectors of the retrieval object; and combining, into one feature vector, the plurality of normalized feature vectors of the retrieval object whose element types are the same.

Before the plurality of feature vectors of the retrieval object whose element types are the same are combined, the plurality of feature vectors of the retrieval object whose element types are the same are normalized. This can ensure that element values of the plurality of feature vectors of the retrieval object whose element types are the same are of a same order of magnitude.

In an implementation, the N codes forming the first data include a first code. An element type of a feature vector of the retrieval object indicated by the first code is an enumeration type or a Boolean type. The first code is an element value of the feature vector of the retrieval object indicated by the first code.

The element value of the feature vector of the retrieval object is directly used as the first code. Therefore, in a retrieval process, the feature vector of the retrieval object does not need to be encoded by using an additional encoding method, to obtain the first code. This can improve retrieval efficiency.

In an implementation, the N codes forming the first data include a first code. An element type of a feature vector of the retrieval object indicated by the first code is an enumeration type or a Boolean type. The N codes forming the second data include the second code, where the second code corresponds to the first code. If the first code is different from the second code corresponding to a first group of object information, the first group of object information is not included in the at least one group of retrieved object information, and the first group of object information belongs to the plurality of groups of object information.

In this implementation, when the first code is different from the second code, the first group of object information is not included in the at least one group of retrieved object information. There is no need to calculate a similarity between the first group of object information and the retrieval object based on the first code and the second code, to determine whether the first group of object information is included in the at least one group of retrieved object information. There is no need to calculate the similarity between the first group of object information and the retrieval object based on another code different from the first code in the N codes forming the first data and another code different from the second code in the N codes forming the second data, to determine whether the first group of object information is included in the at least one group of retrieved object information. This can reduce a computation amount in a retrieval process, and improve retrieval efficiency.

In an implementation, N is greater than 1. The N codes forming the first data include a first code. An element type of a feature vector of the retrieval object indicated by the first code is an enumeration type or a Boolean type.

The N codes forming the second data include the second code. The second code corresponds to the first code. The obtaining a correlation between a plurality of groups of object information and the retrieval object based on the first data and the second data in the index includes: if the first code is the same as the second code corresponding to the first group of object information, calculating a correlation between the first group of object information and the retrieval object based on another code different from the first code in the N codes forming the first data and another code different from the second code in the N codes forming the second data. The first group of object information belongs to the plurality of groups of object information.

This implementation provides another feasible solution for obtaining the correlation between the plurality of groups of object information and the retrieval object when the first code is the same as the second code corresponding to the first group of object information.

In an implementation, the N codes forming the first data include a third code, where an element type of a feature vector of the retrieval object indicated by the third code is a numeric type. The N codes forming the second data include a fourth code, where the fourth code corresponds to the third code. A modality corresponding to the feature vector of the retrieval object indicated by the third code is the same as a modality corresponding to a feature vector of the object information indicated by the fourth code. Therefore, an element type of the feature vector of the object information indicated by the fourth code is also a numeric type.

The obtaining the correlation between the plurality of groups of object information and the retrieval object based on the first data and the second data in the index includes: calculating a first similarity based on the third code and the fourth code. The first similarity is a similarity between the feature vector of the retrieval object indicated by the third code and the feature vector of object information indicated by the fourth code. A second group of object information is one of the plurality of groups of object information.

This implementation provides a feasible solution for calculating the correlation between the plurality of groups of object information and the retrieval object when the element type of the feature vector of the retrieval object indicated by the third code is a numeric type and the element type of the feature vector of the object information indicated by the fourth code is also a numeric type.

In an implementation, the feature vector of the object information indicated by the fourth code includes X second sub-vectors. The fourth code includes each second sub-code of the X second sub-vectors. Each second sub-code corresponds to one codebook. The index further includes a codebook corresponding to the feature vector of the object information indicated by the fourth code. The codebook corresponding to the feature vector of the object information indicated by the fourth code includes each codebook of the X second sub-codes. The feature vector of the retrieval object indicated by the third code includes X first sub-vectors. The third code includes each first sub-code of the X first sub-vectors. The X first sub-codes are in a one-to-one correspondence with the codebooks of the X second sub-codes.

The calculating the first similarity based on the third code and the fourth code includes: calculating the first similarity based on the X first sub-codes, the X second sub-codes, and the codebooks of the X second sub-codes.

The index further includes the codebook corresponding to the feature vector of the object information indicated by the fourth code. Therefore, in a retrieval process, the first similarity may be directly calculated based on the codebook corresponding to the feature vector of the object information indicated by the fourth code. This can improve retrieval efficiency.

In an implementation, the N codes forming the first data further include a fifth code, where an element type of a feature vector of the retrieval object indicated by the fifth code is a numeric type. The N codes forming the second data further include a sixth code, where the sixth code corresponds to the fifth code. A modality corresponding to the feature vector of the retrieval object indicated by the fifth code is the same as a modality corresponding to a feature vector of the object information indicated by the sixth code. Therefore, an element type of the feature vector of the object information indicated by the sixth code is also a numeric type.

The obtaining the correlation between the plurality of groups of object information and the retrieval object based on the first data and the second data in the index further includes: calculating a second similarity between the feature vector of the retrieval object indicated by the fifth code and a feature vector of object information indicated by the sixth code based on the fifth code and the sixth code; and determining a correlation between a second group of object information and the retrieval object based on the first similarity and the second similarity.

This implementation provides a feasible solution for calculating the correlation between the plurality of groups of object information and the retrieval object when the element types of the feature vectors of the retrieval object indicated by the third code and the fifth code are numeric types and the element types of the feature vectors of the object information indicated by the fourth code and the sixth code are also numeric types.

In an implementation, the determining the correlation between the second group of object information and the retrieval object based on the first similarity and the second similarity includes: determining the correlation between the second group of object information and the retrieval object based on a product of the first similarity and a second preset weight coefficient and a product of the second similarity and a third preset weight coefficient. The second weight coefficient is associated with a modality corresponding to the feature vector of the retrieval object indicated by the third code. The third weight coefficient is associated with a modality corresponding to the feature vector of the object information indicated by the fifth code. The second weight coefficient and the third weight coefficient may be the same, or may be different.

In this implementation, a modality corresponding to the first similarity may be different from a modality corresponding to the second similarity in importance. Therefore, the first similarity is multiplied by the corresponding second weight coefficient, and the second similarity is multiplied by the corresponding third weight coefficient. This can ensure that the calculated correlation between the second group of object information and the retrieval object is more accurate.

In an implementation, the retrieval object is retrieved content. A carrier of the content includes one or more of the following: a picture, audio, a video, data, and a text. The retrieved content indicates one or more of information about a person, information about an animal, information about an article, information about a plant, information about a location, information about a landscape, and information about a building.

In an implementation, the object information indicates one or more feature categories of at least one of the following objects: a person, an animal, an article, a plant, a landscape, and a building.

According to a second aspect, an embodiment of this disclosure provides an index construction method, including: obtaining one group of second data separately corresponding to a plurality of groups of object information, where each group of object information corresponds to M feature vectors, the M feature vectors of each group of object information are indicated by one group of second data, each feature vector of the object information corresponds to one modality of the object information, and M is an integer greater than 1; and constructing an index based on the group of second data separately corresponding to the plurality of groups of object information, where the index includes a correspondence between the object information and the second data.

There may be a plurality of types of the second data, for example, may be a code, a text, or a symbol. A method for obtaining the second data may be related to the type of the second data. Therefore, different types of second data correspond to different obtaining methods. There are also a plurality of index construction methods based on the second data. Correspondingly, there may be a plurality of data structures of the index.

Compared with constructing one index corresponding to each modality, only one index is constructed for a plurality of modalities of a plurality of groups of object information in this embodiment of this disclosure. Therefore, this can reduce index storage overheads and a quantity of access times during index loading.

In an implementation, the second data includes N codes, each code forming the second data indicates at least one feature vector of the object information, and N is a positive integer. For example, one of the N codes forming the second data may indicate one feature vector of the object information. Alternatively, one of the N codes forming the second data may indicate a plurality of feature vectors of the object information.

Compared with directly using the M feature vectors of the object information as the second data, using a second code as the second data can also reduce storage overheads.

In an implementation, each code of the N codes forming the second data indicates one feature vector of the object information. The obtaining the second data separately corresponding to the plurality of groups of object information includes: separately encoding the M feature vectors of each group of object information to obtain M codes, to form the second data. M is equal to N. There are a plurality of methods for encoding the feature vector of the object information. For example, the PQ algorithm may be used to encode the feature vector of the object information whose element type is a numeric type.

The M feature vectors are directly encoded separately, and the M feature vectors of the retrieval object do not need to be processed before encoding. This can simplify an encoding process.

In an implementation, codes of a plurality of feature vectors of the object information are included in the N codes forming the second data. The obtaining the second data separately corresponding to the plurality of groups of object information includes: combining a plurality of feature vectors with a same element type in the M feature vectors of each group of object information into one feature vector, to convert the M feature vectors of the object information into N feature vectors of the object information, where N is less than M; and separately encoding the N feature vectors of the object information to obtain N codes, to form the second data. There are a plurality of methods for encoding the feature vector of the object information. For example, the PQ algorithm may be used to encode the feature vector of the object information whose element type is a numeric type.

The plurality of feature vectors of the object information whose element types are the same are combined into one feature vector of the object information, and then encoding is performed. This can complete encoding of the plurality of feature vectors of the object information at one time, improving encoding efficiency in an index construction process.

In an implementation, the combining the plurality of feature vectors of the object information whose element types are the same in the M feature vectors of the object information into one feature vector of the retrieval object includes: normalizing the plurality of feature vectors with the same element type in the M feature vectors of the object information; and combining, into one feature vector of the object information, the plurality of normalized feature vectors of the Before the plurality of feature vectors of the object information whose element types are the same are combined, the plurality of feature vectors of the object information whose element types are the same are normalized. This can ensure that element values of the plurality of feature vectors with the same element type are of a same order of magnitude.

In an implementation, the N codes forming the second data include the second code. An element type of a feature vector of the object information indicated by the second code is an enumeration type or a Boolean type. The second code is an element value of the feature vector of the object information indicated by the second code.

The element value of the feature vector of the object information is directly used as the second code of the feature vector of the object information. Therefore, in an index construction process, the feature vector of the object information does not need to be encoded by using an additional encoding method, to obtain the second code. This can improve encoding efficiency.

In an implementation, the feature vector of the object information indicated by the fourth code includes X second sub-vectors. The fourth code includes each second sub-code of the X second sub-vectors. Each second sub-code corresponds to one codebook.

The index further includes a codebook corresponding to the feature vector of the object information indicated by the fourth code. The codebook corresponding to the feature vector of the object information indicated by the fourth code includes each codebook of the X second sub-codes.

The index further includes the codebook corresponding to the feature vector of the object information indicated by the fourth code. Therefore, in a retrieval process, the first similarity may be directly calculated based on the codebook corresponding to the feature vector of the object information indicated by the fourth code. This can improve retrieval efficiency.

According to a third aspect, an embodiment of this disclosure provides a retrieval apparatus, including the following two units.

A first data obtaining unit is configured to obtain first data corresponding to a retrieval object. The first data indicates M feature vectors of the retrieval object. Each feature vector of the retrieval object corresponds to one modality of the retrieval object. M is an integer greater than 1.

A similarity obtaining unit is configured to obtain a correlation between a plurality of groups of object information and the retrieval object based on the first data and a plurality of groups of second data in an index, to output at least one group of retrieved object information. A correlation between each group of object information in the at least one group of object information and the retrieval object is greater than a first threshold. Each group of object information in the index corresponds to M feature vectors. The M feature vectors corresponding to each group of object information are indicated by one group of second data. Each feature vector of the object information corresponds to one modality of the object information.

The second data in the index indicates the M feature vectors corresponding to the object information, and each feature vector of the object information corresponds to one modality. Therefore, compared with accessing one index corresponding to each modality, multi-modal retrieval of the retrieval object can be completed by accessing only one index. A retrieval delay can be reduced in this embodiment of this disclosure.

In an implementation, the first data includes N codes, each code forming the first data indicates at least one feature vector of the retrieval object, and N is a positive integer.

The second data includes N codes, and each code forming the second data indicates at least one feature vector of the object information.

In an implementation, the N codes forming the first data are in a one-to-one correspondence with the N codes forming the second data. In two corresponding codes, a modality corresponding to a feature vector of the retrieval object indicated by one code is the same as a modality corresponding to a feature vector of the object information indicated by the other code.

In an implementation, the first data obtaining unit is configured to separately encode the M feature vectors of the retrieval object to obtain M codes, to form the first data, where M is equal to N.

In another embodiment of the retrieval apparatus provided in embodiments of this disclosure, the first data obtaining unit is configured to combine a plurality of feature vectors with a same element type in the M feature vectors of the retrieval object into one feature vector, to convert the M feature vectors of the retrieval object into N feature vectors, where N is less than M.

The N feature vectors of the retrieval object are separately encoded, to obtain the N codes, to form the first data.

In an implementation, the first data obtaining unit is configured to: normalize the plurality of feature vectors of the retrieval object whose element types are the same in the M feature vectors of the retrieval object; and combine, into one feature vector, the plurality of normalized feature vectors of the retrieval object whose element types are the same.

In an implementation, the N codes forming the first data include a first code. An element type of a feature vector of the retrieval object indicated by the first code is an enumeration type or a Boolean type. The first code is an element value of the feature vector of the retrieval object indicated by the first code.

In an implementation, the N codes forming the first data include a first code. An element type of a feature vector of the retrieval object indicated by the first code is an enumeration type or a Boolean type. The N codes forming the second data include the second code, where the second code corresponds to the first code. If the first code is different from the second code corresponding to a first group of object information, the first group of object information is not included in the at least one group of retrieved object information, and the first group of object information belongs to the plurality of groups of object information.

In an implementation, N is greater than 1. The N codes forming the first data include a first code. An element type of a feature vector of the retrieval object indicated by the first code is an enumeration type or a Boolean type.

The N codes forming the second data include the second code, where the second code corresponds to the first code.

The similarity obtaining unit is configured to: when the first code is the same as the second code corresponding to the first group of object information, calculate a correlation between the first group of object information and the retrieval object based on another code different from the first code in the N codes forming the first data and another code different from the second code in the N codes forming the second data. The first group of object information belongs to the plurality of groups of object information.

In an implementation, the N codes forming the first data include a third code. An element type of a feature vector of the retrieval object indicated by the third code is a numeric type.

The N codes forming the second data include a fourth code, where the fourth code corresponds to the third code.

The similarity obtaining unit is configured to: calculate a first similarity between the feature vector of the retrieval object indicated by the third code and a feature vector of object information indicated by the fourth code based on the third code and the fourth code. A second group of object information is one of the plurality of groups of object information.

In an implementation, the feature vector of the object information indicated by the fourth code includes X second sub-vectors. The fourth code includes each second sub-code of the X second sub-vectors. Each second sub-code corresponds to one codebook. The index further includes a codebook corresponding to the feature vector of the object information indicated by the fourth code. The codebook corresponding to the feature vector of the object information indicated by the fourth code includes each codebook of the X second sub-codes. The feature vector of the retrieval object indicated by the third code includes X first sub-vectors. The third code includes each first sub-code of the X first sub-vectors. The X first sub-codes are in a one-to-one correspondence with the codebooks of the X second sub-codes.

The similarity obtaining unit is configured to: calculate the first similarity based on the X first sub-codes, the X second sub-codes, and the codebooks of the X second sub-codes.

In an implementation, the first similarity may be a distance between the feature vector of the retrieval object indicated by the third code and the feature vector of object information indicated by the fourth code, and may be a Euclidean distance, a Manhattan distance, a Chebyshev distance, a Minkowski distance, a Hamming distance, and a cosine distance.

In an implementation, the N codes forming the first data further include a fifth code, where an element type of a feature vector of the retrieval object indicated by the fifth code is a numeric type. The N codes forming the second data further include a sixth code, where the sixth code corresponds to the fifth code.

The similarity obtaining unit is configured to: calculate a second similarity between the feature vector of the retrieval object indicated by the fifth code and a feature vector of object information indicated by the sixth code based on the fifth code and the sixth code; and determine a correlation between a second group of object information and the retrieval object based on the first similarity and the second similarity.

In an implementation, the similarity obtaining unit is configured to: determine the correlation between the second group of object information and the retrieval object based on a product of the first similarity and a second preset weight coefficient and a product of the second similarity and a third preset weight coefficient. The second weight coefficient is associated with a modality corresponding to the feature vector of the retrieval object indicated by the third code. The third weight coefficient is associated with a modality corresponding to the feature vector of the object information indicated by the fifth code.

In an implementation, the retrieval object is retrieved content. A carrier of the content includes one or more of the following: a picture, audio, a video, data, and a text. The retrieved content indicates one or more of information about a person, information about an animal, information about an article, information about a plant, information about a location, information about a landscape, and information about a building.

In an implementation, the object information indicates one or more feature categories of at least one of the following objects: a person, an animal, an article, a plant, a landscape, and a building. For specific implementations, related descriptions, and technical effects of the foregoing units, refer to descriptions in the first aspect of embodiments of this disclosure.

According to a fourth aspect, an embodiment of this disclosure provides an index construction apparatus, including the following two units.

A second data obtaining unit is configured to obtain one group of second data separately corresponding to a plurality of groups of object information. Each group of object information corresponds to M feature vectors. The M feature vectors of each group of object information are indicated by one group of second data. Each feature vector of the object information corresponds to one modality of the object information. M is an integer greater than 1.

An index construction unit is configured to construct an index based on the group of second data separately corresponding to the plurality of groups of object information. The index includes a correspondence between the object information and the second data.

Compared with constructing one index corresponding to each modality, only one index is constructed for a plurality of modalities of a plurality of groups of object information in this embodiment of this disclosure. Therefore, this can reduce index storage overheads and a quantity of access times during index loading.

In an implementation, the second data includes N codes, each code forming the second data indicates at least one feature vector of the object information, and N is a positive integer.

In an implementation, the second data includes N codes, each code forming the second data indicates at least one feature vector of the object information, and N is a positive integer.

In an implementation, the second data obtaining unit is configured to: combine a plurality of feature vectors with a same element type in the M feature vectors of each group of object information into one feature vector, to convert the M feature vectors of the object information into N feature vectors of the object information, where N is less than M; and separately encode the N feature vectors of the object information to obtain N codes, to form the second data.

In another embodiment of the index construction apparatus provided in embodiments of this disclosure, the second data obtaining unit is configured to: normalize the plurality of feature vectors with the same element type in the M feature vectors of the object information; and combine, into one feature vector of the object information, the plurality of normalized feature vectors of the object information whose element types are the same.

In an implementation, the N codes forming the second data include the second code.

An element type of a feature vector of the object information indicated by the second code is an enumeration type or a Boolean type. The second code is an element value of the feature vector of the object information indicated by the second code.

In an implementation, the feature vector of the object information indicated by the fourth code includes X second sub-vectors. The fourth code includes each second sub-code of the X second sub-vectors. Each second sub-code corresponds to one codebook.

The index further includes a codebook corresponding to the feature vector of the object information indicated by the fourth code. The codebook corresponding to the feature vector of the object information indicated by the fourth code includes each codebook of the X second sub-codes.

For specific implementations, related descriptions, and technical effects of the foregoing units, refer to descriptions in the first aspect of embodiments of this disclosure.

According to a fifth aspect, an embodiment of this disclosure provides a server, including: at least one a processor and a memory. The memory stores computer-executable instructions that can run on the processor. When the computer-executable instructions are executed by the processor, the server performs the retrieval method according to any one of the implementations of the first aspect.

According to a sixth aspect, an embodiment of this disclosure provides a server, including: at least one a processor and a memory. The memory stores computer-executable instructions that can run on the processor. When the computer-executable instructions are executed by the processor, the server performs the index construction method according to any one of the implementations of the second aspect.

According to a seventh aspect, an embodiment of this disclosure provides a chip or a chip system. The chip or the chip system includes at least one processor and a communication interface, the communication interface and the at least one processor are interconnected through a line, and the at least one processor is configured to run computer programs or instructions, to perform the retrieval method according to any one of the implementations of the first aspect.

According to an eighth aspect, an embodiment of this disclosure provides a chip or a chip system. The chip or the chip system includes at least one processor and a communication interface, the communication interface and the at least one processor are interconnected through a line, and the at least one processor is configured to run computer programs or instructions, to perform the index construction method according to any one of the implementations of the second aspect.

According to a ninth aspect, an embodiment of this disclosure provides a computer storage medium, where the computer storage medium is configured to store computer software instructions used by the foregoing server, and the computer software instructions include a program designed for executing the server.

The server may be the retrieval apparatus described in the third aspect or the index construction apparatus described in the fourth aspect.

According to a tenth aspect, an embodiment of this disclosure provides a computer program product, where the computer program product includes a computer software instruction, and the computer software instruction may be loaded by a processor to implement the retrieval method according to any implementation of the first aspect or the index construction method according to any implementation of the second aspect.

According to an eleventh aspect, an embodiment of this disclosure provides a search engine system, including: one or more servers.

The server is configured to perform the retrieval method according to any one of the implementations of the first aspect, or perform the index construction method according to any one of the implementations of the second aspect.

According to the foregoing technical solutions, it can be learned that embodiments of this disclosure have the following advantages:

The first data is obtained for the retrieval object. The first data indicates M feature vectors of a retrieval object, each feature vector of the retrieval object corresponds to one modality of the retrieval object, and M is an integer greater than 1. Each group of object information corresponds to M feature vectors in an index, the M feature vectors of each group of object information are indicated by one group of second data, and each feature vector of the object information corresponds to one modality of the object information. Therefore, a correlation between a plurality of groups of object information and the retrieval object can be calculated based on the first data and a plurality of groups of second data in the index, and at least one group of retrieved object information whose correlation with the retrieval object is greater than the first threshold is output. In addition, the second data in the index indicates the M feature vectors corresponding to the object information, and each feature vector of the object information corresponds to one modality. Therefore, multi-modal retrieval of the retrieval object can be completed by accessing only one index. This can ensure a low retrieval delay.

DESCRIPTION OF EMBODIMENTS

Embodiments of this disclosure provide a retrieval method, an index construction method, and a related device, to reduce a retrieval delay.

Figure 1:
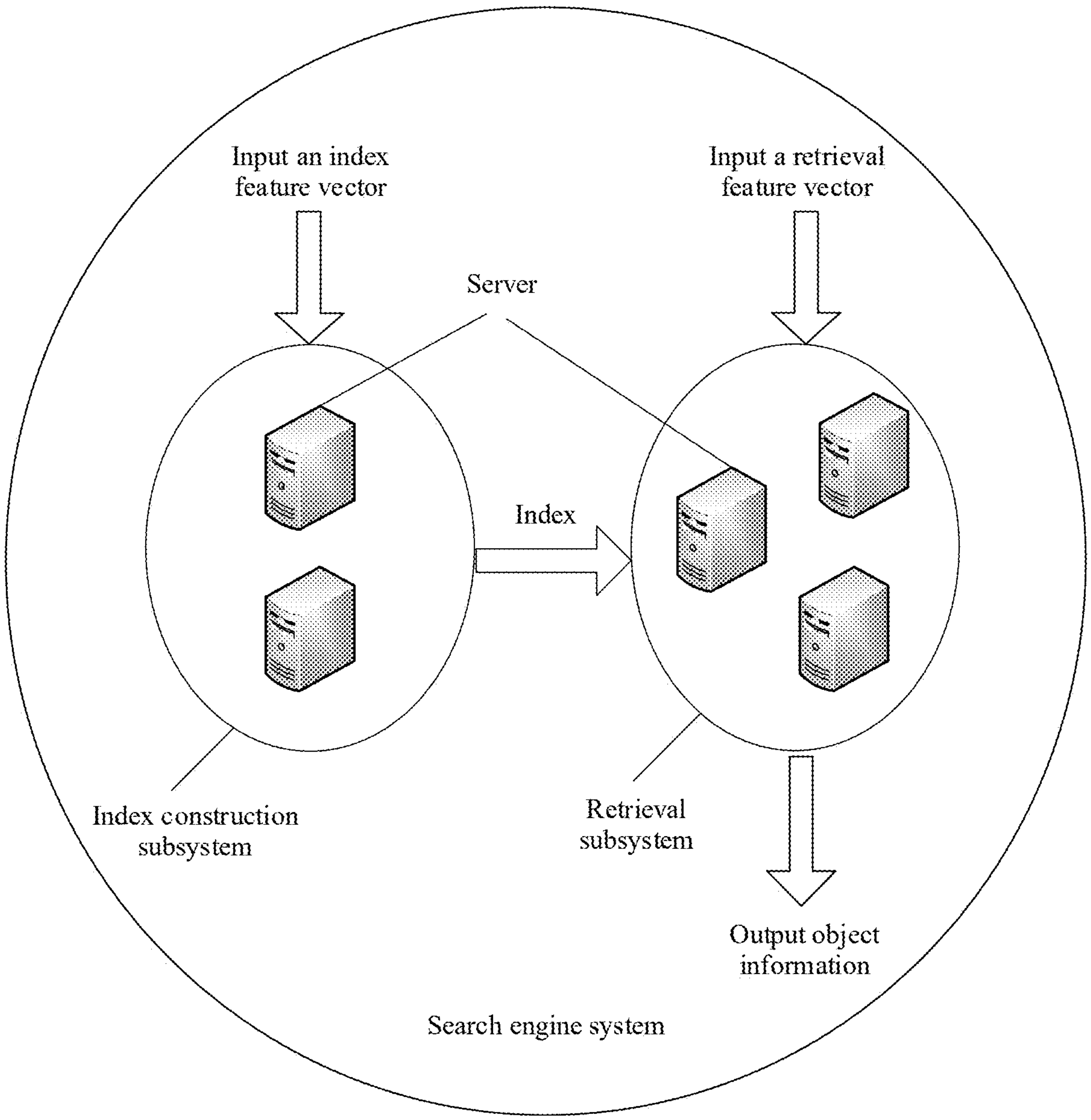
FIG. 1 is a schematic diagram of an architecture of a search engine system according to an embodiment of this disclosure.

Embodiments of this disclosure may be applied to a search engine system shown in FIG. 1. The search engine system includes an index construction subsystem and a retrieval subsystem. The retrieval method in embodiments of this disclosure may be applied to the retrieval subsystem in FIG. 1, and the index construction method in embodiments of this disclosure may be applied to the index construction subsystem.

The index construction subsystem may include one or more servers. In FIG. 1, two servers are used to indicate the index construction subsystem. Alternatively, the retrieval subsystem may include one or more servers. In FIG. 1, three servers are used to indicate the retrieval subsystem.

In another implementation, the retrieval subsystem and the index construction subsystem may share one or more servers.

The server may be a device or a server having a data processing function, such as a cloud server, a network server, an application server, or a management server.

A process of constructing an index by the index construction subsystem is as follows, where the index construction subsystem may be the index construction subsystem in FIG. 1.

A plurality of groups of object information is obtained first, and each group of object information corresponds to a plurality of modalities. One group of object information is used as an example. Corresponding to each modality, one feature vector is extracted from object information. Therefore, each group of object information corresponds to a plurality of feature vectors. Then, the plurality of feature vectors separately corresponding to the plurality of groups of object information are input to the index construction subsystem, and the index construction subsystem constructs an index. The index constructed by the index construction subsystem is stored in the retrieval subsystem for retrieval.

The index construction subsystem shown in FIG. 1 is used as an example. The feature vector of the object information may be input to the index construction subsystem by using a terminal device, or the feature vector of the object information may be input to the index construction subsystem by using a server.

A retrieval process of the retrieval subsystem is as follows, where the retrieval subsystem may be the retrieval subsystem in FIG. 1.

In the retrieval process, a retrieval object is first obtained, and the retrieval object also corresponds to a plurality of modalities. Corresponding to each modality, one feature vector is extracted from the retrieval object. Then, the retrieval object corresponds to a plurality of feature vectors. Then, the plurality of feature vectors of the retrieval object are input into the retrieval subsystem, and the retrieval subsystem retrieves the plurality of feature vectors of the retrieval object based on a preset index. At least one group of object information related to the retrieval object may be output based on a retrieval result.

The retrieval subsystem shown in FIG. 1 is used as an example. The feature vector of the retrieval object may be input to the retrieval subsystem by using a server communicating with a client, and object information output by the retrieval subsystem is received by using the server communicating with the client.

For ease of understanding, the retrieval object, modal, and object information are first described herein.

In this embodiment of this disclosure, the retrieval object is retrieved content. A carrier of the content includes one or more of the following: a picture, audio, a video, data, and a text. The retrieved content indicates one or more of information about a person, information about an animal, information about an article, information about a plant, information about a location, information about a landscape, and information about a building.

The modality may be understood as describing a feature category of one retrieval object. If the retrieval object corresponds to a plurality of modality, it may be understood that the retrieved object has a plurality of feature categories. The feature category of the retrieval object may be defined based on an actual requirement. This is not limited in this embodiment of this disclosure.

For example, if the retrieval object is multimedia information, a text, voice, an image, a video, and the like may all be used as one modality of the multimedia information. If the retrieval object is commodity information, a price, a material, a specification, and an applicable scenario may all be used as one modality. If the retrieval object is an image, a local feature and a global feature of the image may all be used as one modality.

The modality is further described below by using a specific example. Assuming that the retrieval object is information describing an event that an astronomical enthusiast observes the night sky, the following can be used as one modal: an observed geographical location, an observation angle, whether a meteor is observed (logical judgment), a scenario description for observing the night sky, a text description of the meteor by the astronomical enthusiast, a voice description of the meteor by the astronomical enthusiast, a behavior description of the astronomical enthusiast (for example, whether a photo is taken), an image of the meteor, and the like.

The object information also indicates a feature category of an object, and indicates one or more feature categories of at least one of the following objects: a person, an animal, an article, a plant, a landscape, and a building.

The object information may include a feature category of a same type as that of the retrieval object, and may further include another type of feature category.

For example, if the retrieval object is an image of a commodity, the object information may include an image of another commodity similar to the commodity. This function is available in some shopping software or a search engine. Alternatively, the object information may include text information, video information, and the like of another commodity similar to the commodity.

The following further describes the retrieval object and the object information by using a specific example.

Figure 2:
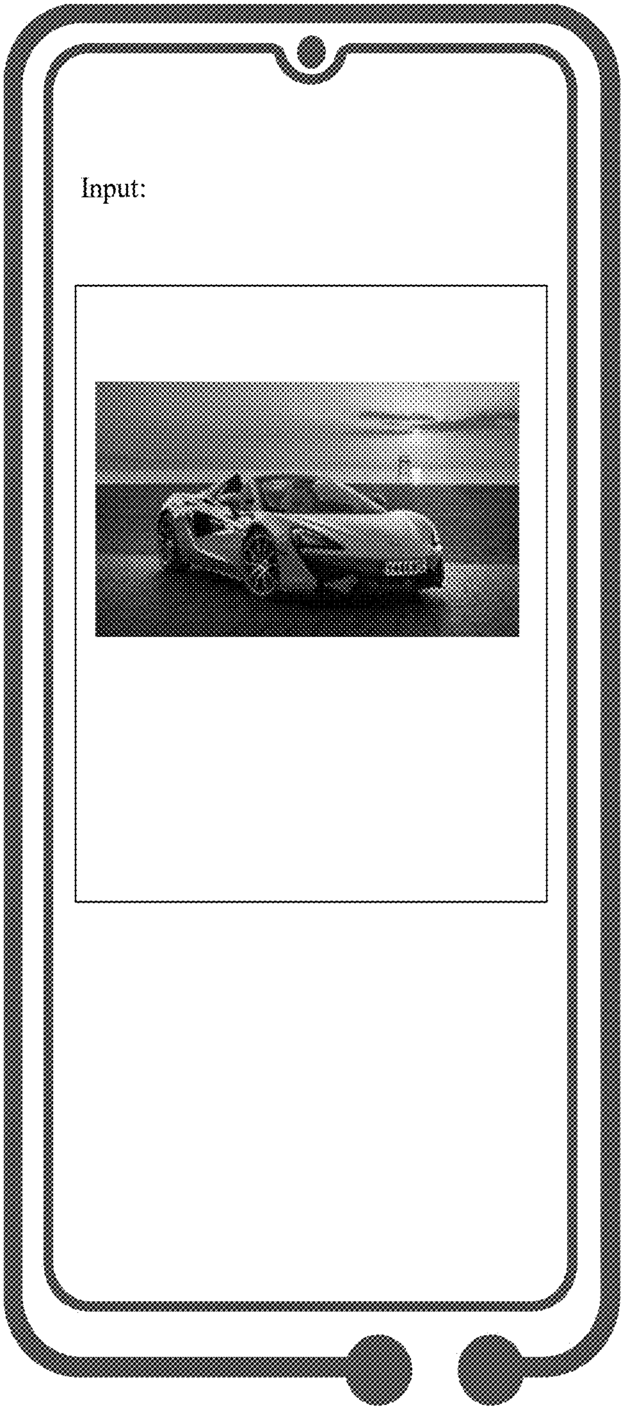
FIG. 2 is a schematic diagram of a first screen of a mobile phone according to an embodiment of this disclosure.
Figure 3:
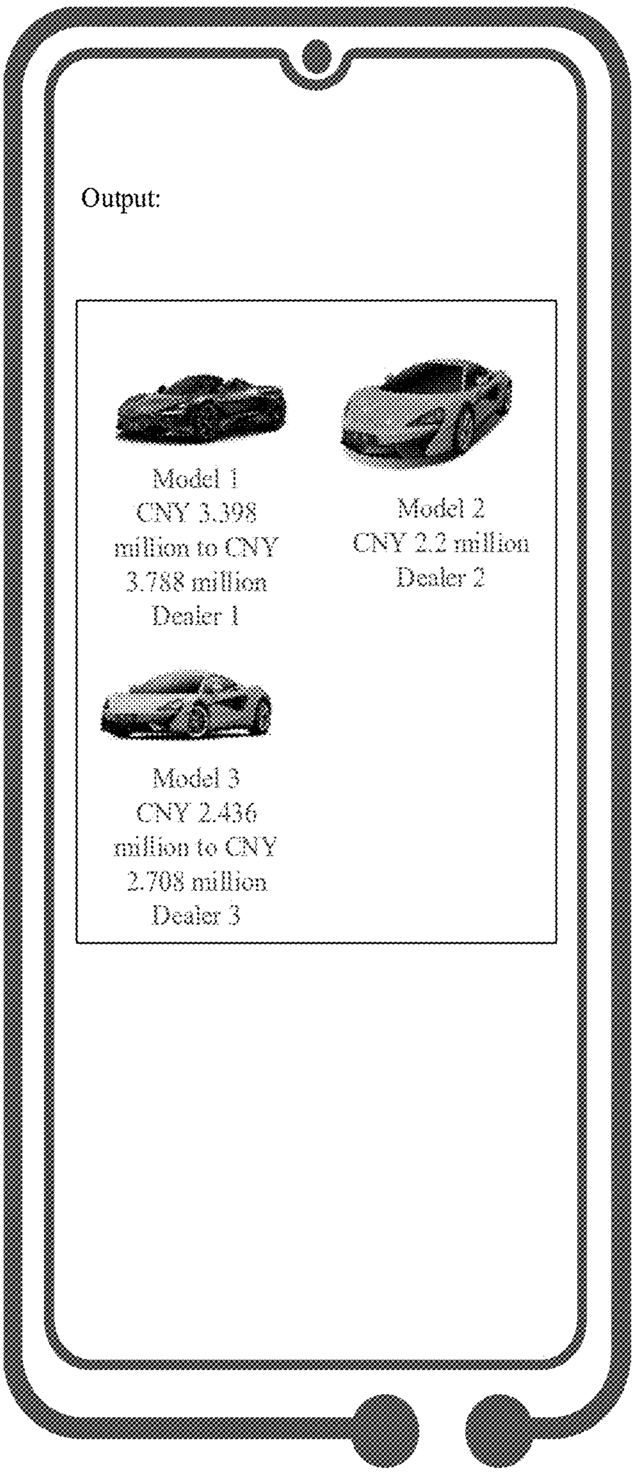
FIG. 3 is a schematic diagram of a second screen of a mobile phone according to an embodiment of this disclosure.

The example includes the following:

As shown in FIG. 2, the retrieval object is a photo of a vehicle. The photo is taken by a user with a camera of a mobile phone. The user operates the mobile phone to send (or after detecting the photo, the mobile phone automatically send) the photo to a server, to retrieve information about the vehicle in the photo. The server communicating with the mobile phone receives the photo of the vehicle in FIG. 2, extracts a plurality of feature vectors from the photo of the vehicle, inputs the plurality of feature vectors to the retrieval subsystem for retrieval, and then sends a retrieval result to the server communicating with the mobile phone. Finally, the server communicating with the mobile phone outputs three groups of object information, and sends the three groups of object information to the mobile phone for display. The three groups of object information are shown in FIG. 3. Each group of object information includes one photo of a vehicle, and further includes a model, price, and dealer of the vehicle.

It may be understood that, in an index construction process, if one index is constructed for each modality of a plurality of groups of object information, a plurality of indexes need to be constructed. This causes a rise in index storage overheads and a quantity of access times during index loading. In addition, a plurality of indexes need to be accessed to implement multi-modal retrieval of the retrieval object in a retrieval process. Therefore, a retrieval delay may be high, and retrieval performance may be poor.

Therefore, embodiments of this disclosure provide a retrieval method and an index construction method. In the index construction process, only one index is constructed for all modalities of the plurality of groups of object information, to reduce the index storage overheads and the quantity of access times during index loading. In addition, multi-modal retrieval of the retrieval object can be implemented by accessing only one index in the retrieval process, reducing the retrieval delay.

Figure 4:
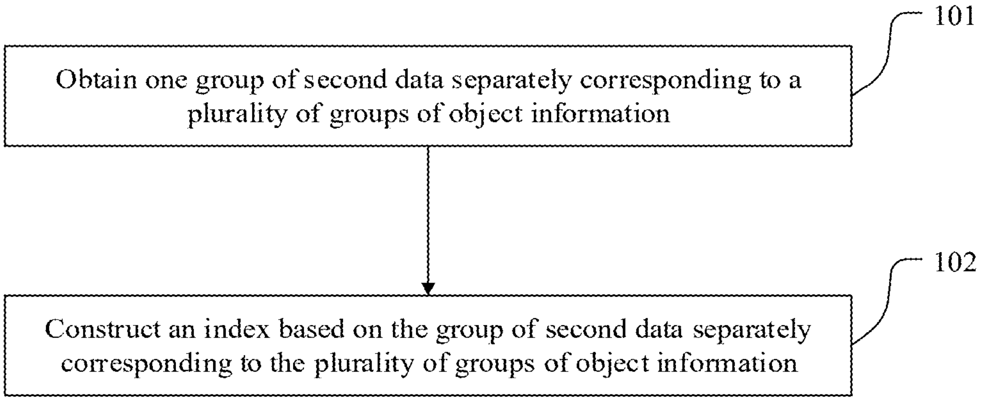
FIG. 4 is a schematic diagram of a first embodiment of an index construction method according to an embodiment of this disclosure.

The following describes the index construction method in embodiments of this disclosure. FIG. 4 is a schematic diagram of a first embodiment of an index construction method according to an embodiment of this disclosure. An embodiment of this disclosure provides an index construction method, including the following steps.

Step 101: Obtain one group of second data separately corresponding to a plurality of groups of object information. Each group of object information corresponds to M feature vectors. The M feature vectors of each group of object information are indicated by one group of second data. Each feature vector of the object information corresponds to one modality of the object information. M is an integer greater than 1.

There may be a plurality of types of content of the object information. This is not limited in this embodiment of this disclosure.

Each group of object information corresponds to M modalities. One group of object information is used as an example. Corresponding to each modality, one feature vector may be extracted from object information. Therefore, each group of object information corresponds to M feature vectors.

Assuming that the object information is clothing information, the object information may correspond to three modalities: a price, a style, and a season. Corresponding to the three modalities, one feature vector may be separately extracted from the object information. Finally, three feature vectors may be obtained.

There may be a plurality of types of the second data. This is not limited in this embodiment of this disclosure. For example, the second data may be a code, a text, or a symbol.

A method for obtaining the second data may be related to the type of the second data. Therefore, different types of second data correspond to different obtaining methods. For a specific type of second data, there may be a plurality of obtaining methods. This is not limited in this embodiment of this disclosure.

For example, if the second data is a code, there may be a plurality of methods for encoding the M feature vectors of the object information, for example, may be a PQ algorithm.

Step 102: Construct an index based on the group of second data separately corresponding to the plurality of groups of object information. The index includes a correspondence between the object information and the second data.

It should be noted that there are also a plurality of index construction methods based on the second data. This is not limited in this disclosure either. Correspondingly, there may be a plurality of data structures of the index. This is not limited in this embodiment of this disclosure. The index construction method is a mature technology, and details are not described herein.

A correspondence between the object information and the second data in the index may be used for multi-modal retrieval. The following describes a retrieval process based on the correspondence with reference to FIG. 6A to FIG. 8.

To more intuitively understand the index construction method in embodiments of this disclosure, the following uses an example for specific description.

Figure 5:
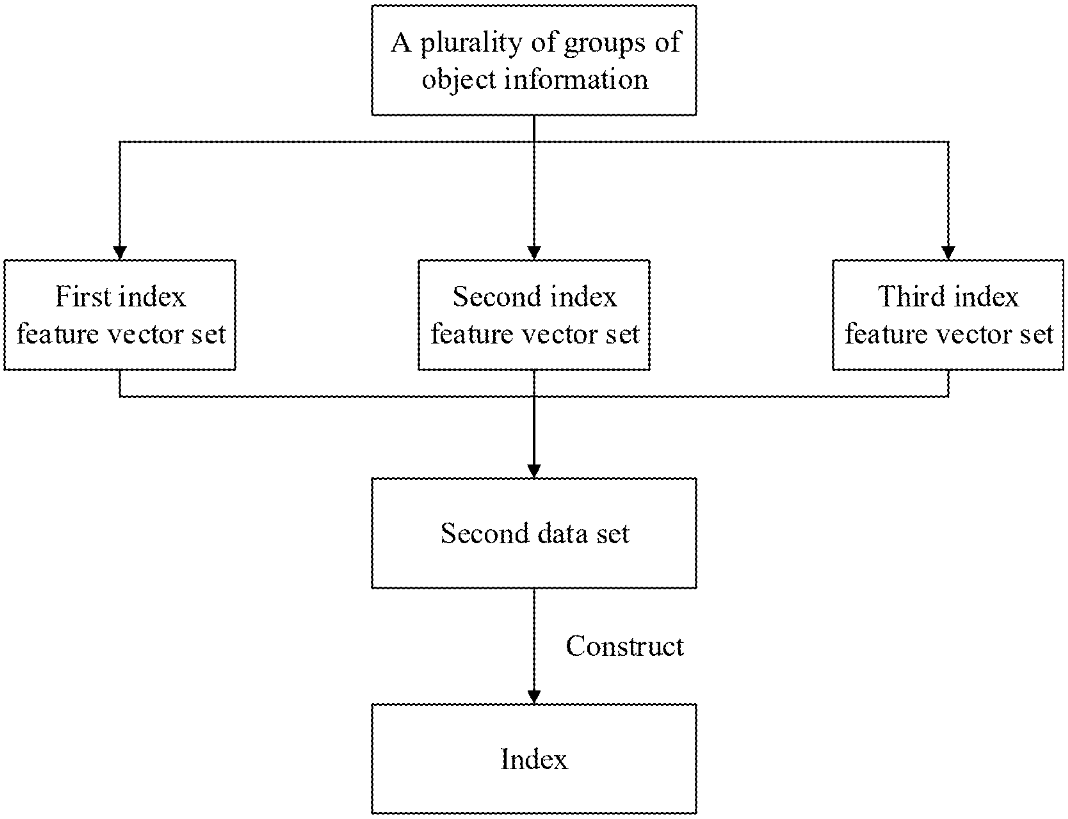
FIG. 5 is a schematic diagram of a second embodiment of an index construction method according to an embodiment of this disclosure.

FIG. 5 is a schematic diagram of a second embodiment of an index construction method according to an embodiment of this disclosure. It is assumed that a plurality of groups of object information correspond to three modalities (including a first modality, a second modality, and a third modality). One feature vector may be constructed for each modality of each group of object information. Therefore, a feature vector set of first object information may be obtained for the first modality. The feature vector set of the first object information includes feature vectors corresponding to the first modality of all groups of object information. Similarly, a feature vector set of second object information may be obtained for the second modality. The feature vector set of the second object information includes feature vectors corresponding to the second modality of the all groups of object information. A feature vector set of third object information may be obtained for the third modality. The feature vector set of the third object information includes feature vectors corresponding to the third modality of all groups of object information.

Then, the second data is used to indicate feature vectors corresponding to three modalities of each group of object information, to obtain a second data set. One index may be constructed based on the second data set, and the index is used for multi-modal retrieval.

Compared with constructing one index corresponding to each modality, only one index is constructed for a plurality of modalities of a plurality of groups of object information in this embodiment of this disclosure. Therefore, this can reduce index storage overheads and a quantity of access times during index loading.

It can be learned from the foregoing description that the second data may be a code. It should be noted that when the second data is a code, there may be a plurality of code composition types of the second data.

Based on the foregoing embodiment, in another embodiment of the index construction method provided in embodiments of this disclosure, the second data includes N codes. Each code forming the second data indicates at least one feature vector of the object information. N is a positive integer.

For example, one of the N codes forming the second data may indicate one feature vector of the object information. Alternatively, one of the N codes forming the second data may indicate a plurality of feature vectors of the object information.

In an implementation, a Cartesian product of the N codes may be obtained. The Cartesian product of the N codes may be referred to as fusion coding. In this embodiment of this disclosure, the fusion coding is referred to as the second data. The index may be constructed based on the fusion coding.

Compared with directly using the M feature vectors of the retrieval object as the second data, using the N codes as the second data in this embodiment of this disclosure can reduce storage overheads. Similarly, compared with directly using the M feature vectors of the object information as the second data, using a second code as the second data can also reduce storage overheads.

It may be understood that the method for obtaining the second data may be related to the code composition of the second data. If the code composition of the second data is different, the corresponding method for obtaining the second data is also different.

For example, when each code of the N codes forming the second data indicates one feature vector of the object information, N is equal to M. The obtaining the second data separately corresponding to the plurality of groups of object information includes: separately encoding the M feature vectors of each group of object information to obtain N codes, to form the second data. M is equal to N.

In this embodiment of this disclosure, the M feature vectors are directly encoded separately, and the M feature vectors of the retrieval object do not need to be processed before encoding. This can simplify an encoding process.

It should be noted that there are a plurality of methods for encoding the feature vector of the object information. This is not limited in this embodiment of this disclosure. The method for encoding the feature vector of the object information may be selected based on an element type of the feature vector of the object information. The following description provides more details.

For example, it is assumed that the N codes forming the second data include the second code. If an element type of a feature vector of the object information indicated by the second code is an enumeration type or a Boolean type, an element value of the feature vector of the object information indicated by the second code is directly used as the second code, in other words, the second code is the element value of the feature vector of the object information.

It should be noted that if the element type of the vector is an enumeration type or a Boolean type, elements in the vector are indicated in limited manners. In addition, a similarity between two vectors may be determined directly by determining whether the elements are indicated in the same manner.

It is first assumed that element types of two feature vectors of the object information are both an enumeration type or a Boolean type. If elements in the two feature vectors of the object information are indicated in the same manner, it may be considered that the two feature vectors of the object information are completely similar, to be specific, a similarity is 100%. On the contrary, if the elements in the two feature vectors of the object information are indicated in different manners, it may be considered that the two feature vectors of the object information are completely dissimilar, to be specific, a similarity is 0.

Both a condition type and a category type are enumeration types.

In addition, when the element type of the feature vector of the object information is an enumeration type or a Boolean type, a code of an indication manner of the element of the feature vector is usually used as the element of the feature vector. Therefore, whether the two feature vectors of the object information are the same may be determined based on element values of the feature vectors.

The following uses an example to show that the element type of the feature vector of the object information is an enumeration type.

It is assumed that the object information is clothing information, and corresponds to a season modality. It may be understood that the season includes only four types: spring, summer, autumn, and winter. Therefore, if the feature vector is extracted from the object information corresponding to the season modality, an element type of the feature vector is a category type. Correspondingly, the element of the feature vector is indicated in only four manners. Based on binary, enumerated values 00, 01, 10, and 11 may be used as elements of the feature vector, and respectively correspond to four types: spring, summer, autumn, and winter. To be specific, the feature vector extracted from the object information may be one of the following: (0, 0), (0, 1), (1, 0), and (1, 1).

The feature vectors (0, 0) and (0, 1) of the object information are used as examples. The two feature vectors (0, 0) and (0, 1) have different elements, and respectively correspond to two types: spring and summer. Because the two types are not similar, to be specific, a similarity is 0, based on that two feature vectors (0, 0) and (0, 1) have different elements, it may be directly considered that a similarity between the two feature vectors (0, 0) and (0, 1) is 0. The similarity between the two feature vectors does not need to be calculated by calculating a distance between the two feature vectors.

In this embodiment of this disclosure, the element value of the feature vector of the object information is directly used as the second code of the feature vector of the object information. In addition, the element value of the feature vector of the object information is used as the second code of the feature vector of the object information. Therefore, the feature vector of the object information does not need to be encoded by using an additional encoding method, to obtain the second code. This can improve encoding efficiency.

In addition, it should be noted that when an element type of a feature vector of the object information indicated by the second code is an enumeration type or a Boolean type, the feature vector of the object information can be encoded by using another encoding method, to obtain the second code. Therefore, the second code may be obtained by encoding the feature vector of the object information indicated by the second code by using the another encoding method, and is not limited to an element value of the feature vector of the object information indicated by the second code.

The foregoing describes a method for obtaining the second code when the element type of the feature vector of the object information is an enumeration type or a Boolean type. The following describes a method for obtaining the second code when the element type of the feature vector of the object information is a numeric type.

First, it should be noted that the numeric type may include an integer type, a long integer type, a floating point number type, a double-precision floating point number type, and the like.

Assuming that the N codes forming the second data include a fourth code, if an element type of a feature vector of the object information indicated by the fourth code is a numeric type, the feature vector of the object information indicated by the fourth code can be encoded by using a plurality of methods. In an implementation, the PQ algorithm may be used to encode the feature vector of the object information indicated by the fourth code, to obtain the fourth code.

A process of encoding the feature vector of the object information indicated by the fourth code according to the PQ algorithm is as follows.

It is assumed that the feature vector of the object information indicated by the fourth code is a first feature vector. First feature vectors corresponding to all groups of object information form a feature vector set space. The feature vector set space is first divided into X subspaces, and then one codebook is obtained by learning each subspace according to a K-means algorithm. Finally, a Cartesian product of codebooks corresponding to all subspaces is used as a codebook of the feature vector set space.

The first feature vector corresponding to each group of object information may be encoded based on the codebook of the feature vector set space, to obtain the fourth code.

One group of object information is used as an example. After the feature vector set space is divided into the X subspaces, the feature vector indicated by the fourth code includes X second sub-vectors. Each second sub-vector may be encoded based on the codebook of the subspace. Then, the fourth code may be obtained by combining codes of the X second sub-vectors.

Therefore, in another embodiment of the index construction method provided in embodiments of this disclosure, the feature vector of the object information indicated by the fourth code includes X second sub-vectors. The fourth code includes each second sub-code of the X second sub-vectors. Each second sub-code corresponds to one codebook.

The index further includes a codebook corresponding to the feature vector of the object information indicated by the fourth code. The codebook corresponding to the feature vector of the object information indicated by the fourth code includes each codebook of the X second sub-codes.

In the foregoing embodiment, each of the N codes forming the second data indicates one feature vector of the object information. In addition, codes indicating a plurality of feature vectors of the object information may be included in the N codes forming the second data. Details are described below.

Figure 6A:
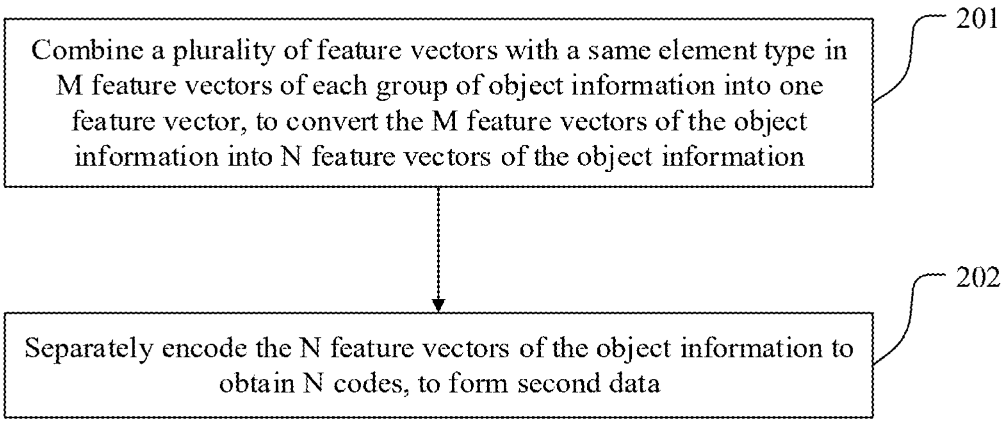
FIG. 6A is a schematic diagram of an embodiment of obtaining second data according to an embodiment of this disclosure.

When the codes indicating the plurality of feature vectors of the object information are included in the N codes forming the second data, N is less than M. In this case, there are a plurality of methods for obtaining the second data separately corresponding to the plurality of groups of object information. In an implementation, FIG. 6A is a schematic diagram of an embodiment of obtaining the second data according to an embodiment of this disclosure. The obtaining the second data separately corresponding to the plurality of groups of object information includes the following steps.

Step 201: Combine a plurality of feature vectors with a same element type in M feature vectors of each group of object information into one feature vector, to convert the M feature vectors of the object information into N feature vectors of the object information. N is less than M.

It should be noted that, there are a plurality of cases for combining the plurality of feature vectors with the same element type in the M feature vectors of each group of object information into one feature vector.

For example, a plurality of feature vectors whose element types are all enumeration types may be combined into one feature vector. Alternatively, a plurality of feature vectors whose element types are all Boolean types may be combined into one feature vector. Alternatively, a plurality of feature vectors whose element types are all numeric types may be combined into one feature vector.

For another example, assuming that P feature vectors of object information whose element types are the same are included in the M feature vectors of the object information, and P is an integer greater than 1, the combining a plurality of feature vectors with the same element type in the M feature vectors of the object information into one feature vector includes: combining the P feature vectors of the object information into one feature vector of the object information, or combining some of the P feature vectors of the object information into one feature vector.

The following uses an example to describe a process of combining the plurality of feature vectors with the same element type in the M feature vectors of the object information into one feature vector of the object information.

Figure 6B:
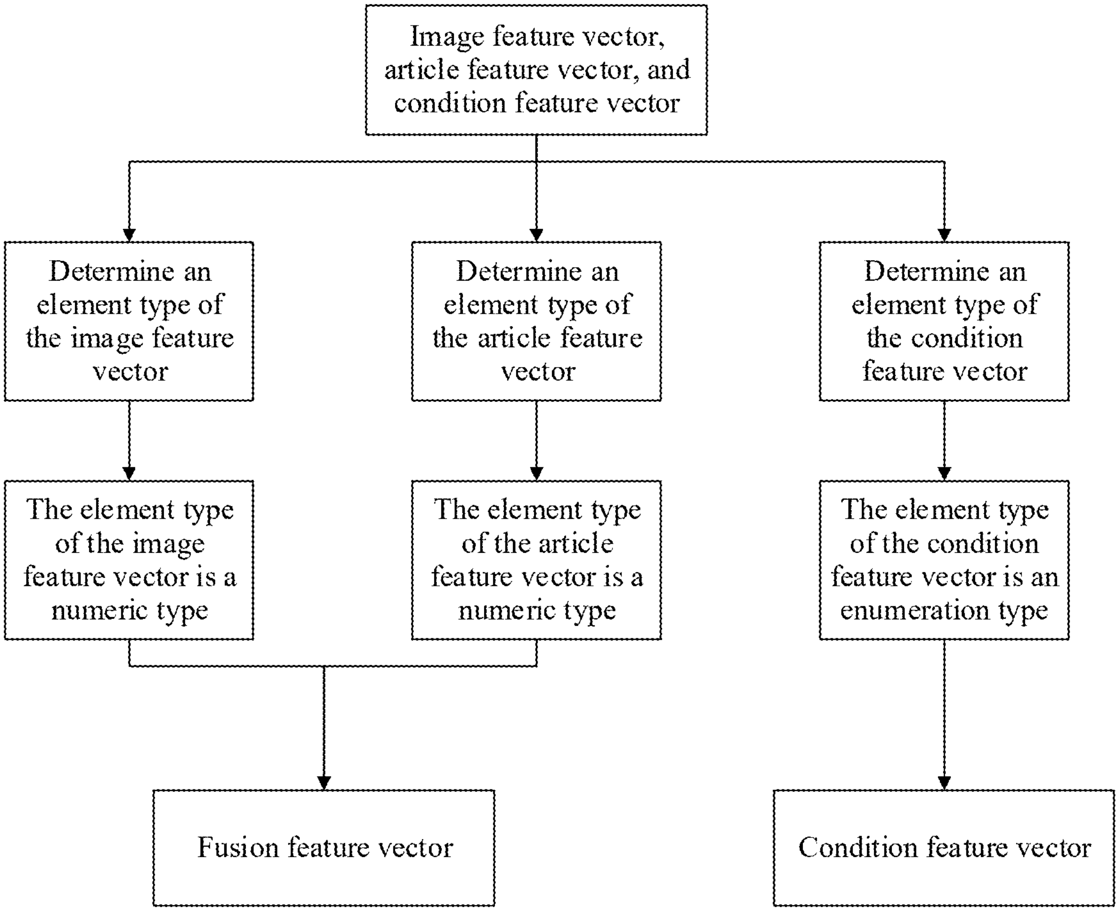
FIG. 6B is a schematic diagram of an embodiment of combining into a feature vector of object information according to an embodiment of this disclosure.

For example, the object information is an image of an article, and the M feature vectors of the object information include an image feature vector, an article feature vector, and a condition feature vector. As shown in FIG. 6B, element types of the image feature vector and the article feature vector are numeric types, and an element type of the condition feature vector is an enumeration type or a Boolean type. Then, the image feature vector and the item feature vector are combined into one fusion feature vector, and the condition feature vector remains unchanged, so that three feature vectors of the object information are converted into two feature vectors of the object information.

In this embodiment of this disclosure, a plurality of feature vectors of a retrieval object whose element types are the same are combined into one feature vector of the retrieval object, and then encoding is performed. This can complete encoding of the plurality of feature vectors of the retrieval object at one time, improving encoding efficiency.

In addition, the plurality of feature vectors with the same element type in the M feature vectors of the object information can be combined into one feature vector of the object information by using a plurality of methods.

For example, elements in the plurality of feature vectors of the object information may be directly permutated and combined, to obtain one feature vector of the object information.

For example, each feature vector of the object information may be first processed, and then the plurality of feature vectors of the object information are combined into one feature vector of the object information.

For another example, the plurality of feature vectors of the object information have the same element type but correspond to different modalities.

Therefore, element values of the feature vectors may be different in an order of magnitude and data distribution. Therefore, the plurality of feature vectors of the object information may be normalized based on importance of each modal, and then the plurality of feature vectors of the object information are combined into one feature vector of the object information.

Figure 7:
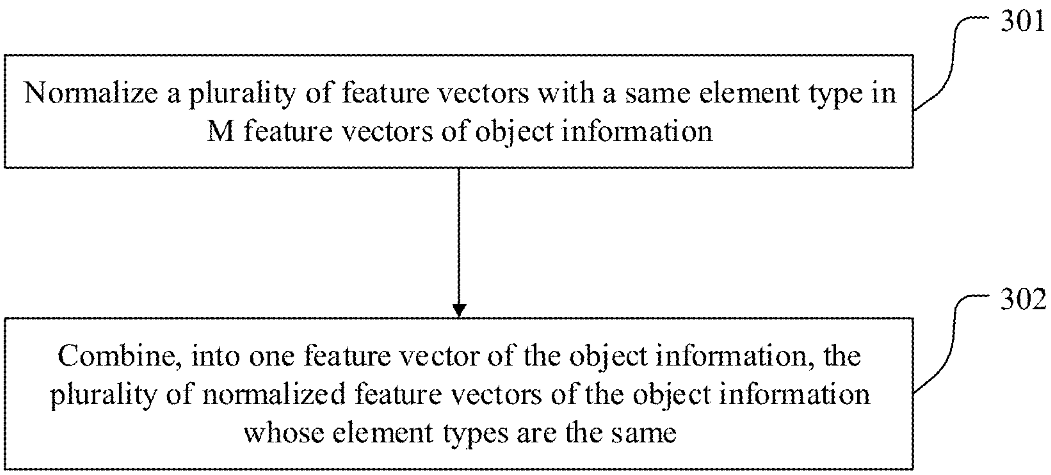
FIG. 7 is a schematic diagram of another embodiment of combining into a feature vector of object information according to an embodiment of this disclosure.

FIG. 7 is a schematic diagram of another embodiment of combining into a feature vector of object information according to an embodiment of this disclosure. Combining a plurality of feature vectors with a same element type in M feature vectors of the object information into one feature vector includes the following steps.

Step 301: Normalize the plurality of feature vectors with the same element type in the M feature vectors of the object information.

It should be noted that normalization is a mature technology, and details are not described herein.

After the M feature vectors of the object information are normalized, the plurality of feature vectors with the same element type in the M feature vectors of the object information may be further multiplied by a corresponding fourth weight coefficient. Each of the plurality of feature vectors with the same element type corresponds to one fourth weight coefficient.

It should be noted that because a modality corresponds to the feature vector of the object information, in this embodiment of this disclosure, the fourth weight coefficient is set for the feature vector of the object information based on importance of each modality. Fourth weight coefficients corresponding to any two feature vectors of the object information may be the same or different.

For example, it is still assumed that the object information is clothing information, and corresponds to three modalities: a price, a style, and a season. Based on a specific scenario, importance of the price modality is lower than importance of the other two modalities. In this case, a feature vector of the object information corresponding to the price modality may correspond to a small fourth weight coefficient, for example, 0.2, and a feature vector of the object information corresponding to the other two modalities may correspond to a large fourth weight coefficient, for example, 0.4.

If three feature vectors extracted corresponding to the three modalities, namely the price, style, and season, are (0.2, 0.3, 0.5), (0.4, 0.2, 0.4), and (0.4, 0.6) after normalization, products of the three feature vectors and the corresponding fourth weight coefficient are (0.04, 0.06, 0.1), (0.16, 0.08, 0.16), and (0.16, 0.24).

Step 302: Combine, into one feature vector of the object information, the plurality of normalized feature vectors of the object information whose element types are the same.

It should be noted that the plurality of normalized feature vectors with the same element type may be combined into one feature vector of the object information. This is not limited in this embodiment of this disclosure.

For example, elements in the products may be permutated and combined, to obtain one feature vector of the object information. Based on the three products (0.2, 0.3, 0.5), (0.4, 0.2, 0.4), and (0.4, 0.6) obtained in step 301, the feature vector of the object information obtained through combination may be (0.2, 0.3, 0.5, 0.4, 0.2, 0.4, 0.4, 0.6).

Step 202: Separately encode the N feature vectors of the object information to obtain N codes, to form the second data.

It should be noted that a method for encoding each of the N feature vectors of the object information is the same as a method for encoding each of the M feature vectors of the object information. For details, refer to related descriptions of obtaining the second code and obtaining the fourth code in the foregoing embodiment for understanding.

The foregoing describes the index construction method, and the following describes a retrieval method.

Figure 8:
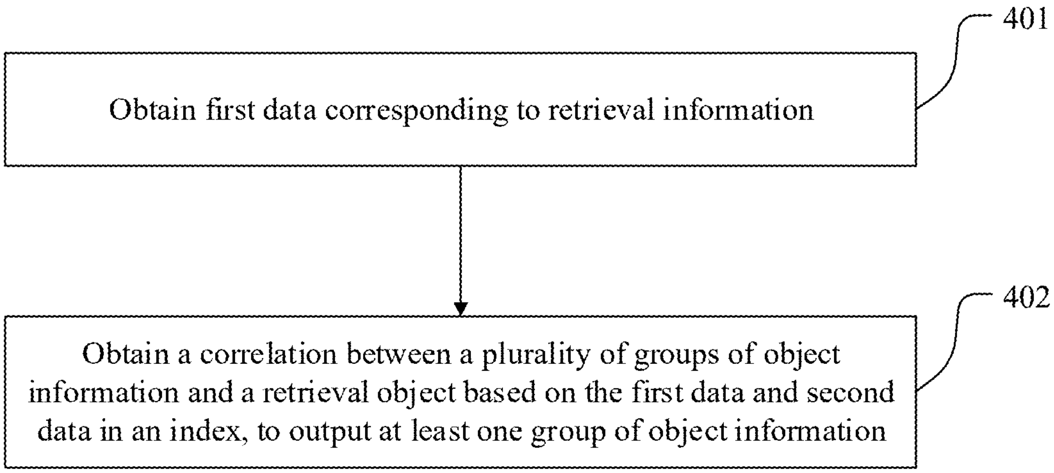
FIG. 8 is a schematic diagram of a first embodiment of constructing an index according to an embodiment of this disclosure.

FIG. 8 is a schematic diagram of an embodiment of a retrieval method according to an embodiment of this disclosure. As shown in FIG. 8, an embodiment of this disclosure provides a retrieval method, including the following steps.

Step 401: Obtain first data corresponding to a retrieval object, where the first data indicates M feature vectors of the retrieval object, each feature vector of the retrieval object corresponds to one modality of the retrieval object, and M is an integer greater than 1.

It should be noted that, based on the foregoing description, it can be learned that in an index construction process, second data is used to indicate M feature vectors corresponding to object information. Therefore, in this embodiment of this disclosure, the first data with the same type as that of the second data is used to indicate the M feature vectors corresponding to the retrieval object. In addition, a method for obtaining the first data is also the same as the method for obtaining the second data in the foregoing embodiment.

The retrieval object corresponds to M modalities. Corresponding to each modality, one feature vector may be extracted from the retrieval object. Therefore, the M feature vectors corresponding to the retrieval object may be obtained.

For example, the retrieval object is clothing information, then the retrieval object may correspond to three modalities: a price, a style, and a season. Corresponding to the three modalities, one feature vector may be separately extracted from the retrieval object. Finally, three feature vectors of the retrieval object may be obtained.

Similar to the second data, there may be a plurality of types of the first data. This is not limited in this embodiment of this disclosure. For example, the type of the first data may also be a code, a character, or a symbol.

The method for obtaining the first data may also be related to the type of the first data. Therefore, different types of first data correspond to different obtaining methods. For a specific type of first data, there may be a plurality of obtaining methods. This is not limited in this embodiment of this disclosure.

For example, if the first data is a code, there may be a plurality of methods for encoding the M feature vectors of the retrieval object, and a PQ algorithm may be used.

Step 402: Obtain a correlation between a plurality of groups of object information and the retrieval object based on the first data and a plurality of groups of second data in an index, to output at least one group of retrieved object information.

A correspondence between the object information and the second data are included in the index. Each group of object information corresponds to M feature vectors. The M feature vectors of each group of object information are indicated by the second data. Each feature vector of the object information corresponds to one modality of the object information.

For example, the index may include the second data and an identifier of the object information, and the identifier corresponds to the second data.

To better understand the retrieval method in this embodiment of this disclosure, a correspondence between the object information and the retrieval object is first described herein.

The object information may include information of a same type as that of the retrieval object, and may further include information of a type that does not exist in the retrieval object.

For example, if the retrieval object is an image, a group of object information may include another image. In addition, the group of object information may further include a text description of the image and a source of the image.

For another example, if the retrieval object includes a text description and a voice description of a commodity, a group of object information may include a text description and a voice description of another commodity. In addition, the group of object information may further include an image of the commodity.

It should be noted that the correlation may be indicated by using a plurality of methods. For example, the M feature vectors of the retrieval object are indicated based on the first data, the second data indicates the M feature vectors of the object information. Therefore, the correlation may be indicated by a distance between vectors, including a Euclidean distance, a Manhattan distance, a Chebyshev distance, a Minkovski distance, a cosine distance, a Hamming distance, and the like. A smaller distance between vectors indicates a higher correlation, and a greater distance between vectors indicates a lower correlation.

For another example, the vector distance may also be converted into a score, to be specific, the score indicates the correlation. A smaller distance between vectors indicates a higher score and a higher correlation, and a greater distance between vectors indicates a lower score and a lower correlation.

To more intuitively understand the retrieval method in embodiments of this disclosure, the following uses an example for specific description.

Figure 9:
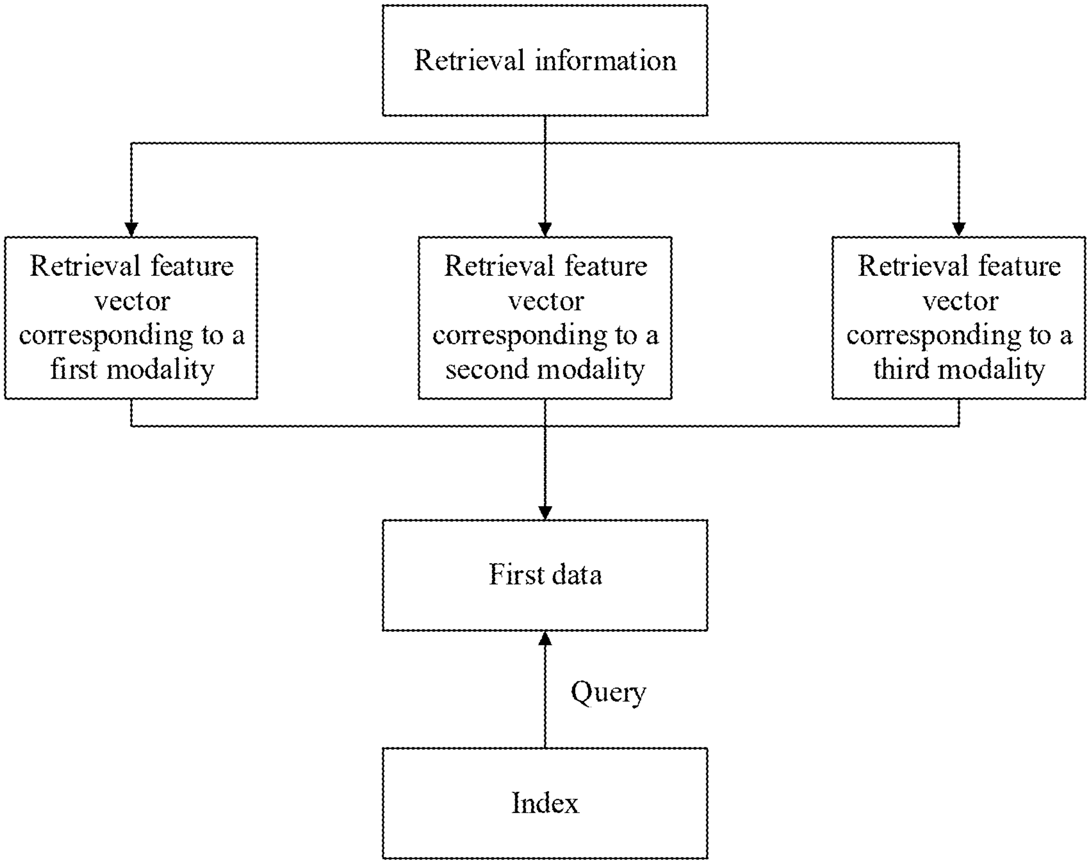
FIG. 9 is a schematic diagram of a second embodiment of constructing an index according to an embodiment of this disclosure.

FIG. 9 is a schematic diagram of a second embodiment of constructing an index according to an embodiment of this disclosure. It is assumed that a retrieval object corresponds to three modalities (including a first modal, a second modal, and a third modal), and one feature vector of the retrieval object may be constructed for each modality of the retrieval object. First data is used to indicate three feature vectors corresponding to the three modalities. Then second data is obtained by querying one index constructed in the corresponding example shown in FIG. 5. Finally, multi-modal retrieval is performed on the retrieval object based on the first data and the second data.

It may be understood that a method for obtaining a correlation between a plurality of groups of object information and the retrieval object may be related to a type of the first data. To be specific, corresponding to different types of first data and second data, methods for obtaining the correlation between the plurality of groups of object information and the retrieval object are different. For first data and second data that are of a specific type, there may be a plurality of methods for obtaining the correlation between the plurality of groups of object information and the retrieval object. This is not limited in this embodiment of this disclosure.

In this embodiment of this disclosure, when a correlation between one group of object information and the retrieval object is greater than a first threshold, the group of object information is output. Therefore, a correlation between each group of object information in at least one group of object information and the retrieval object is greater than the first threshold. The first threshold may be set based on an actual requirement. For example, the first threshold may be 0, or may be another value greater than 0 and less than 1. In addition, the object information may be indicated in a plurality of manners. Therefore, identifiers separately corresponding to the at least one group of object information, instead of the object information, may be output.

In this embodiment of this disclosure, the second data in the index indicates the M feature vectors corresponding to the object information, and each feature vector of the object information corresponds to one modality. Therefore, multi-modal retrieval of the retrieval object can be completed by accessing only one index, reducing a retrieval delay.

It can be learned from the foregoing description that the type of the first data is the same as a type of the second data. Therefore, when the second data is a code, the first data may also be a code. In addition, when the first data is a code, code composition of the first data is the same as code composition of the second data, and there are a plurality of code composition types.

In another embodiment of the retrieval method provided in embodiments of this disclosure, the second data includes N codes in the index. Each code forming the second data indicates at least one feature vector of the object information.

Similar to the second data, the first data also includes N codes, each code forming the first data indicates at least one feature vector of the retrieval object, and N is a positive integer.

Similar to the N codes forming the second data, one of N codes forming the first data may indicate one feature vector of the retrieval object; and one of N codes forming the first data may indicate a plurality of feature vectors of the retrieval object.

The N codes forming the first data are in a one-to-one correspondence with the N codes forming the second data. In two corresponding codes, a modality corresponding to a feature vector of the retrieval object indicated by one code is the same as a modality corresponding to a feature vector of the object information indicated by the other code. It may be also described for short as that modalities separately corresponding to two corresponding codes are the same.

It should be noted that, there are two cases in which the modalities separately corresponding to the two corresponding codes are the same.

Case 1: The code forming the first data indicates one feature vector of the retrieval object, the code forming the second data indicates one feature vector of the object information, and a modality corresponding to the feature vector of the retrieval object is the same as a modality of the feature vector of the object information.

Case 2: Codes forming the first data indicate the plurality of feature vectors of the retrieval object, and codes forming the second data indicate a plurality of feature vectors of the object information. In this case, modalities separately corresponding to the plurality of feature vectors of the retrieval object are the same as modalities separately corresponding to the plurality of feature vectors of the object information.

For example, assuming that the codes forming the first data indicate two feature vectors of the retrieval object, and the codes forming the second data indicate two feature vectors of the object information, two modalities corresponding to the two feature vectors of the retrieval object are the same as two modalities corresponding to the two feature vectors of the object information.

It may be understood that a method for obtaining the first data may be related to the code composition of the first data. If the code composition of the first data is different, the corresponding method for obtaining the first data is also different.

For example, when each code of the N codes forming the first data indicates one feature vector of the retrieval object, N is equal to M. The obtaining the first data corresponding to the retrieval object includes: separately encoding M feature vectors of the retrieval object to obtain the N codes, to form the first data. M is equal to N.

It should be noted that a method for encoding the feature vector of the retrieval object is the same as a method for encoding the feature vector of the object information, and there may be a plurality of methods. This is not limited in this embodiment of this disclosure. The method for encoding the feature vector of the retrieval object may be selected based on an element type of the feature vector of the retrieval object. The following description provides more details.

For example, it is assumed that the N codes forming the first data include the first code. If an element type of a feature vector of the retrieval object indicated by the first code is an enumeration type or a Boolean type, an element value of the feature vector of the retrieval object indicated by the first code is directly used as the first code, in other words, the first code is the element value of the feature vector of the retrieval object indicated by the first code.

It should be noted that, because the enumeration type or the Boolean type has been described in detail in the foregoing embodiment of index construction, the enumeration type or the Boolean type in this embodiment of this disclosure may be understood with reference to the foregoing embodiment of index construction.

In this embodiment of this disclosure, the element value of the feature vector of the retrieval object is directly used as the first code of the feature vector of the retrieval object. Therefore, in a retrieval process, the feature vector of the retrieval object does not need to be encoded by using an additional encoding method, to obtain the first code. This can improve retrieval efficiency.

It may be understood that, the method for obtaining the first data is the same as the method for encoding the feature vector of the object information. If the element type of the feature vector of the retrieval object indicated by the first code is an enumeration type or a Boolean type, the first code may alternatively be obtained by encoding, by using a specific encoding method, the feature vector of the retrieval object indicated by the first code, and is not limited to the element value of the feature vector of the retrieval object indicated by the first code.

The foregoing describes a case in which the element type of the feature vector of the retrieval object indicated by the first code is an enumeration type or a Boolean type. The following describes a case in which the element type of the feature vector of the retrieval object indicated by the first code is a numeric type.

Similarly, in this embodiment of this disclosure, the numeric type includes an integer type, a long integer type, a floating-point number type, a double-precision floating point number type, and the like.

Assuming that the N codes forming the first data include a third code, if an element type of a feature vector of the retrieval object indicated by the third code is a numeric type, the feature vector of the retrieval object indicated by the third code can be encoded by using a plurality of methods. In an implementation, a PQ algorithm may be used to encode the feature vector of the retrieval object indicated by the third code, to obtain the third code.

Assuming that a modality corresponding to the feature vector of the retrieval object indicated by the third code is the same as a modality corresponding to a feature vector of the object information indicated by the fourth code, a process of encoding the feature vector of the retrieval object indicated by the third code according to the PQ algorithm is as follows:

The feature vector of the retrieval object is divided into a plurality of sub-vectors by using a division method that is the same as that for dividing the feature vector set space in an index construction process. Each sub-vector corresponds to one subspace obtained through division in the index construction process. Each sub-vector is encoded based on a codebook of the subspace corresponding to the sub-vector.

Finally, a code of the feature vector of the retrieval object may be obtained by combining codes of the sub-vectors.

It should be noted that the feature vector of the retrieval object indicated by the third code may be encoded by using another algorithm, which is not limited to the PQ algorithm.

In the foregoing embodiment, each of the N codes forming the first data indicates one feature vector of the retrieval object. In addition, similar to the second data, codes indicating a plurality of feature vectors of the retrieval object may be also included in the N codes forming the first data. Details are described below.

Figure 10:
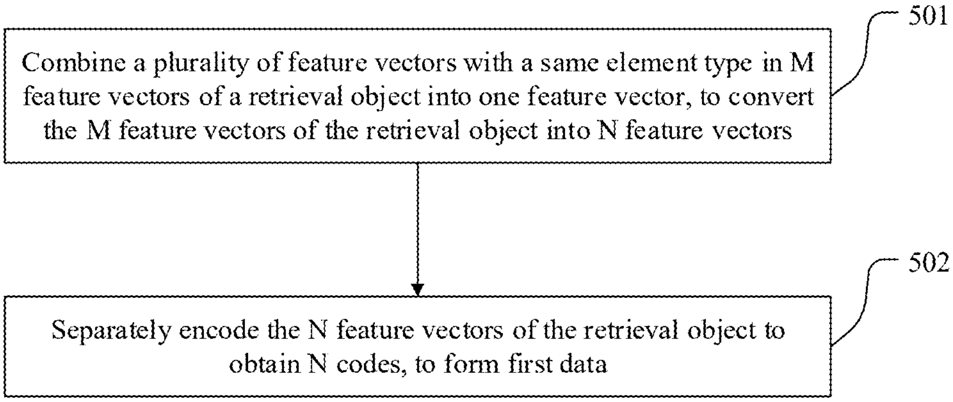
FIG. 10 is a schematic diagram of an embodiment of obtaining first data according to an embodiment of this disclosure.

When the codes indicating the plurality of feature vectors of the retrieval object are included in the N codes forming the first data, N is less than M. In this case, there are a plurality of methods for obtaining the first data corresponding to the retrieval object. In an implementation, FIG. 10 is a schematic diagram of an embodiment of obtaining first data according to an embodiment of this disclosure. The obtaining the first data corresponding to retrieval object includes the following steps.

Step 501: Combine a plurality of feature vectors with a same element type in M feature vectors of the retrieval object into one feature vector, to convert the M feature vectors of the retrieval object into N feature vectors.

It should be noted that, there are a plurality of cases for combining the plurality of feature vectors with the same element type in the M feature vectors of each group of retrieval object into one feature vector.

For example, a plurality of feature vectors of the retrieval object whose element types are all enumeration types may be combined into one feature vector. Alternatively, a plurality of feature vectors of the retrieval object whose element types are all numeric types may be combined into one feature vector.

For another example, assuming that P feature vectors with the same element type are included in the M feature vectors of the retrieval object, and P is an integer greater than 1, the combining a plurality of feature vectors with the same element type in the M feature vectors of the retrieval object into one feature vector of the retrieval object includes: combining the P feature vectors of the retrieval object into one feature vector of the retrieval object, or combining some of the P feature vectors of the retrieval object into one feature vector of the retrieval object.

In addition, the plurality of feature vectors with the same element type in the M feature vectors of the retrieval object can be combined into one feature vector of the retrieval object by using a plurality of methods.

For example, elements in the plurality of feature vectors of the retrieval object whose element types are the same may be directly permutated and combined, to obtain one feature vector of the retrieval object.

For example, the feature vectors of the retrieval object whose element types are the same may be first processed, and then the plurality of feature vectors of the retrieval object whose element types are the same are combined into one feature vector of the retrieval object.

The feature vectors of the retrieval object whose element types are the same may be feature vectors of the retrieval object whose element types are all enumeration types, Boolean types, integer types, long integer types, floating point number types, or double-precision floating point number types.

For another example, the plurality of feature vectors of the retrieval object have the same element type but correspond to different modalities. Therefore, element values of the feature vectors may be different in an order of magnitude and data distribution. Therefore, the plurality of feature vectors of the retrieval object may be normalized based on importance of each modal, and then the plurality of feature vectors of the retrieval object are combined into one feature vector of the retrieval object.

Figure 11:
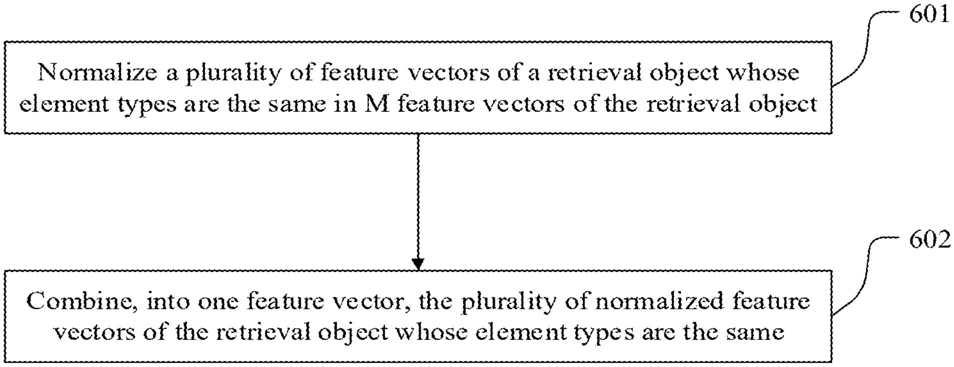
FIG. 11 is a schematic diagram of an embodiment of combining into a feature vector of retrieval object according to an embodiment of this disclosure.

FIG. 11 is a schematic diagram of an embodiment of combining into a feature vector of retrieval object according to an embodiment of this disclosure. Combining a plurality of feature vectors of the retrieval object whose element types are the same in M feature vectors of the retrieval object into one feature vector of the retrieval object includes the following steps.

Step 601: Normalize the plurality of feature vectors of the retrieval object whose element types are the same in the M feature vectors of the retrieval object.

It should be noted that normalization is a mature technology, and details are not described herein.

After the M feature vectors of the retrieval object are normalized, the plurality of feature vectors with the same element type in the M feature vectors of the retrieval object may be further multiplied by a corresponding second weight coefficient. The second weight coefficient corresponds to the feature vector of the retrieval object.

It should be noted that because a modality corresponds to the feature vector of the retrieval object, in this embodiment of this disclosure, one second weight coefficient t is set for each feature vector of the retrieval object.

Second weight coefficients corresponding to any two feature vectors of the retrieval object may be the same or different. In addition, if the feature vector of the retrieval object and the feature vector of object information correspond to a same modality, the second weight coefficient corresponding to the feature vector of the retrieval object is the same as the fourth weight coefficient corresponding to the feature vector of the object information.

For example, it is still assumed that the retrieval object is clothing information, and corresponds to three modalities: a price, a style, and a season. Based on a specific scenario, importance of the price modality is lower than importance of the other two modalities. In this case, a feature vector of the retrieval object corresponding to the price modality may correspond to a small second weight coefficient, for example, 0.2, and a feature vector of the retrieval object corresponding to the other two modalities may correspond to a large second weight coefficient, for example, 0.4.

If three feature vectors extracted corresponding to the three modalities, namely the price, style, and season, are (0.5, 0, 0.5), (0.5, 0, 0.5), and (1, 0) after normalization, products of the three feature vectors of the retrieval object and the corresponding fourth weight coefficient are (0.1, 0, 0.1), (0.2, 0, 0.2), and (0.4, 0).

Step 602: Combine, into one feature vector, the plurality of normalized feature vectors of the retrieval object whose element types are the same.

It should be noted that the plurality of normalized feature vectors with the same element type may be combined into one feature vector. This is not limited in this embodiment of this disclosure.

For example, elements in the plurality of feature vectors may be permutated and combined, to obtain one feature vector. Based on the three feature vectors (0.5, 0, 0.5), (0.5, 0, 0.5), and (1, 0) obtained in step 301, the feature vector of the retrieval object obtained through combination may be (0.5, 0, 0.5, 0.5, 0, 0.5, 1, 0).

Before the plurality of feature vectors of the retrieval object whose element types are the same are combined, the plurality of feature vectors of the retrieval object whose element types are the same are normalized. This can ensure that element values of the plurality of feature vectors of the retrieval object whose element types are the same are of a same order of magnitude.

Step 502: Separately encode the N feature vectors of the retrieval object to obtain N codes, to form the first data. N is less than M.

It should be noted that a method for encoding each of the N feature vectors of the retrieval object is the same as a method for encoding each of the M feature vectors of the retrieval object. A corresponding encoding method may be selected based on an element type of the feature vector of the retrieval object. For details, refer to related descriptions of separately encoding the M feature vectors of the retrieval object in the foregoing embodiment.

In this embodiment of this disclosure, a plurality of feature vectors of a retrieval object whose element types are the same are combined into one feature vector of the retrieval object, and then encoding is performed. This can complete encoding of the plurality of feature vectors of the retrieval object at one time, improving encoding efficiency.

The foregoing describes a process of obtaining the first data corresponding to the retrieval object in the retrieval process, and the following describes calculation of a correlation between a plurality of groups of object information and the retrieval object.

Based on the foregoing embodiments, this embodiment of this disclosure provides another embodiment of a retrieval method. In this embodiment, N codes forming the second data include a second code. An element type of a feature vector of the object information indicated by the second code is an enumeration type or a Boolean type.

Correspondingly, the N codes forming the first data include a first code. An element type of a feature vector of the retrieval object indicated by the first code is an enumeration type or a Boolean type. In addition, the first code corresponds to the second code.

It should be noted that when N is equal to 1, it indicates that the first data includes only the first code.

When N is greater than 1, it indicates that the N codes forming the first data include another code in addition to the first code.

In this embodiment of this disclosure, calculating the correlation between the plurality of groups of object information and the retrieval object based on the first data and the second data in an index to output at least one group of object information may include:

If the first code is different from the second code corresponding to a first group of object information, it may be determined that a correlation between the first group of object information and the retrieval object is less than a first threshold, and therefore the first group of object information is not included in the at least one group of retrieved object information, and the first group of object information is one group of the plurality of groups of object information.

It can be learned based on the foregoing description that, if the first code corresponds to the second code, a modality corresponding to the feature vector of the retrieval object indicated by the first code is the same as a modality corresponding to a feature vector of the object information indicated by the second code. In index construction and retrieval processes, a same encoding method is used to encode a feature vector of the retrieval object and a feature vector of the object information that correspond to a same modality. Therefore, if the first code is different from the second code, it may be considered that an element of the feature vector of the retrieval object indicated by the first code is different from an element of the feature vector of the object information indicated by the second code.

In addition, if elements in two feature vectors of the object information are indicated in different manners, it indicates that the two feature vectors of the object information are completely dissimilar, to be specific, a similarity is 0. Therefore, in this embodiment of this disclosure, if the first code is different from the second code, it may be directly determined that the correlation between the first group of object information and the retrieval object is less than or equal to the first threshold.

This embodiment of this disclosure provides a pruning policy, to be specific, when the first code is different from the second code, it is directly determined that the correlation between the first group of object information and the retrieval object is less than or equal to the first threshold. There is no need to calculate a similarity between the first group of object information and the retrieval object based on the first code and the second code, to determine whether the first group of object information is included in the at least one group of retrieved object information. There is no need to calculate the similarity between the first group of object information and the retrieval object based on another code different from the first code in the N codes forming the first data and another code different from the second code in the N codes forming the second data, to determine whether the first group of object information is included in the at least one group of retrieved object information. This can reduce a computation amount in a retrieval process, and improve retrieval efficiency.

The foregoing describes a case in which the first code is different from the second code, and the following describes a case in which the first code is the same as the second code.

For example, when N is equal to 1, to be specific, the first data includes only the first code, and the second data includes only the second code, if the first code is the same as the second code, it may be directly determined that a correlation between the first group of object information and the retrieval object is greater than the first threshold.

For example, N is greater than 1, to be specific, the N codes forming the first data include another code in addition to the first code. Similarly, the N codes forming the second data include another code in addition to the second code.

In this case, the calculating the correlation between the plurality of groups of object information and the retrieval object based on the first data and the second data in an index to output at least one group of object information includes: if the first code is the same as the second code corresponding to the first group of object information, calculating the correlation between the first group of object information and the retrieval object based on another code different from the first code in the N codes forming the first data and another code different from the second code in the N codes forming the second data, to output the at least one group of object information.

The foregoing embodiment describes a process of calculating the correlation between the plurality of groups of object information and the retrieval object based on a condition that the element type of the feature vector of the retrieval object indicated by the first code is an enumeration type or a Boolean type. The following further describes the process of calculating the correlation between the plurality of groups of object information and the retrieval object based on a code of a feature vector of the retrieval object whose element type is a numeric type.

Based on the foregoing embodiments, in another embodiment of the retrieval method provided in embodiments of this disclosure, N codes forming the second data include a fourth code. An element type of a coding feature vector indicated by the fourth code is a numeric type.

The N codes forming the first data include a third code. An element type of a feature vector of the retrieval object indicated by the third code is a numeric type. The third code corresponds to the fourth code.

It can be learned based on the foregoing description that, if the third code corresponds to the fourth code, a modality corresponding to the feature vector of the retrieval object indicated by the third code is the same as a modality corresponding to the feature vector of the object information indicated by the fourth code. Therefore, the element type of the feature vector of the object information indicated by the fourth code is also a numeric type.

Obtaining the correlation between the plurality of groups of object information and the retrieval object based on the first data and the second data in the index includes: calculating a first similarity based on the third code and the fourth code. The first similarity is a similarity between the feature vector of the retrieval object indicated by the third code and the feature vector of object information indicated by the fourth code. A second group of object information is one of the plurality of groups of object information.

The first similarity may be a distance between the feature vector of the retrieval object indicated by the third code and the feature vector of object information indicated by the fourth code, and may be a Euclidean distance, a Manhattan distance, a Chebyshev distance, a Minkowski distance, a Hamming distance, and a cosine distance.

It should be noted that there are a plurality of methods for calculating the first similarity based on the third code and the fourth code. This is not limited in this embodiment of this disclosure.

The methods for calculating the first similarity based on the third code and the fourth code may be related to an encoding method for obtaining the third code and the fourth code. For example, if both the third code and the fourth code are obtained through encoding according to a PQ algorithm, the first similarity between the feature vector of the retrieval object indicated by the third code and the feature vector of the object information indicated by the fourth code may be calculated based on the third code and the fourth code according to the PQ algorithm.

A specific process of calculating the first similarity between the feature vector of the retrieval object indicated by the third code and the feature vector of the object information indicated by the fourth code according to the PQ algorithm is as follows.

First, it can be learned based on the foregoing description that, a feature vector set space is divided into a plurality of subspaces (corresponding to the fourth code) in an index construction process, and one codebook is obtained for each subspace. A plurality of sub-vectors forming the feature vector of the object information may be encoded based on the codebook of each subspace, to obtain the fourth code.

In a retrieval process, the feature vector of the retrieval object indicated by the third code is divided into a plurality of sub-vectors (corresponding to the third code) by using a method the same as that for dividing the feature vector set space. The plurality of sub-vectors are in a one-to-one correspondence with the plurality of subspaces obtained by dividing the feature vector set space. It is assumed that a first sub-vector is one of the plurality of sub-vectors corresponding to the third code, a first subspace is one of the plurality of subspaces corresponding to the fourth code and includes a plurality of second sub-vectors, and the first sub-vectors are in a one-to-one correspondence with the first subspace.

Based on each codebook of the plurality of subspaces corresponding to the fourth code, the plurality of sub-vectors obtained by dividing the feature vector of the retrieval object indicated by the third code may be encoded, to obtain the third code.

Therefore, in another embodiment of the retrieval method provided in this disclosure, the feature vector of the object information indicated by the fourth code includes X second sub-vectors. The fourth code includes each second sub-code of the X second sub-vectors. Each second sub-code corresponds to one codebook.

The index further includes a codebook corresponding to the feature vector of the object information indicated by the fourth code. The codebook corresponding to the feature vector of the object information indicated by the fourth code includes each codebook of the X second sub-codes.

The feature vector of the retrieval object indicated by the third code includes X first sub-vectors. The third code includes each first sub-code of the X first sub-vectors.

The X first sub-codes are in a one-to-one correspondence with the codebooks of the X second sub-codes.

The calculating the first similarity based on the third code and the fourth code includes: calculating the first similarity based on the X first sub-codes, the X second sub-codes, and the codebooks of the X second sub-codes.

The index further includes the codebook corresponding to the feature vector of the object information indicated by the fourth code. Therefore, in a retrieval process, the first similarity may be directly calculated based on the codebook corresponding to the feature vector of the object information indicated by the fourth code. This can improve retrieval efficiency.

It should be noted that there are a plurality of methods for determining a correlation between the second group of object information and the retrieval object based on the first similarity. For example, the first similarity may be directly used as the correlation between the second group of object information and the retrieval object in the following cases.

Case 1:

The N codes forming the first data include only the third code and a code indicating a feature vector of the retrieval object whose element type is an enumeration type (or a Boolean type). The N codes forming the second data include only the fourth code and a code indicating an index feature vector whose element type is an enumeration type (or a Boolean type). The code indicating the feature vector of the retrieval object whose element type is an enumeration type (or a Boolean type) is the same as the code indicating the index feature vector whose element type is an enumeration type (or a Boolean type).

Case 2:

The N codes forming the first data include only the third code. The N codes forming the second data include only the fourth code.

The first similarity between the feature vector of the retrieval object indicated by the third code and the feature vector of object information indicated by the fourth code may be considered as a similarity between modalities separately corresponding to the second group of object information and the retrieval object that are indicated by the third code.

It is assumed that the N codes forming the second data further include a code indicating a feature vector of the object information whose element type is a numeric type in addition to the fourth code, and the N codes forming the first data further include a code indicating a feature vector of the retrieval object whose element type is a numeric type in addition to the third code. A similarity between other modalities separately corresponding to the second group of object information and the retrieval object that are indicated by the third code needs to be calculated. Finally, the correlation between the second group of object information and the retrieval object is determined based on a similarity between all modalities.

Based on the foregoing embodiment, in another embodiment of the retrieval method provided in embodiments of this disclosure, the N codes forming the first data further include a fifth code. An element type of a feature vector of the retrieval object indicated by the fifth code is a numeric type.

The N codes forming the second data further include a sixth code. An element type of a coding feature vector indicated by the sixth code is a numeric type.

The fifth code corresponds to the sixth code.

It can be learned based on the foregoing description that, if the fifth code corresponds to the sixth code, a modality corresponding to the feature vector of the retrieval object indicated by the fifth code is the same as a modality corresponding to a feature vector of the object information indicated by the sixth code.

The obtaining the correlation between the plurality of groups of object information and the retrieval object based on the first data and the second data in the index further includes: calculating a second similarity between the feature vector of the retrieval object indicated by the fifth code and a feature vector of object information indicated by the sixth code based on the fifth code and the sixth code.

It should be noted that a method for calculating the second similarity is the same as a method for calculating the first similarity. For details, refer to the method for calculating the first similarity in the foregoing embodiment.

The second similarity may be considered as a similarity between modalities separately corresponding to the second group of object information and the retrieval object that are of the fifth code.

The correlation between the second group of object information and the retrieval object is determined based on the first similarity and the second similarity.

It should be noted that there are a plurality of methods for determining the correlation between the second group of object information and the retrieval object based on the first similarity and the second similarity. This is not limited in this embodiment of this disclosure.

For example, a sum of the first similarity and the second similarity may be directly used as the correlation between the second group of object information and the retrieval object in the following cases.

Case 3:

The N codes forming the first data include only the third code, the fifth code, and a code indicating a feature vector of the retrieval object whose element type is an enumeration type (or a Boolean type). The N codes forming the second data include only the fourth code, the sixth code, and a code indicating an index feature vector whose element type is an enumeration type (or a Boolean type). The code indicating the feature vector of the retrieval object whose element type is an enumeration type or a Boolean type is the same as the code indicating the index feature vector whose element type is an enumeration type (or a Boolean type).

Case 4:

The N codes forming the first data include only the third code and the fifth code. The N codes forming the second data include only the fourth code and the sixth code.

Based on the foregoing description, it can be learned that the first similarity may be considered as the similarity between modalities separately corresponding to the second group of object information and the retrieval object that are indicated by the third code, and the second similarity may be considered as the similarity between modalities separately corresponding to the second group of object information and the retrieval object that are of the fifth code. Different modalities may have different importance. Therefore, the correlation between the second group of object information and the retrieval object may be determined based on the importance of the modal, the first similarity, and the second similarity.

Based on the foregoing embodiment, in another embodiment of the retrieval method provided in embodiments of this disclosure, the determining the correlation between the second group of object information and the retrieval object based on the first similarity and the second similarity, to output the at least one group of object information includes: determining the correlation between the second group of object information and the retrieval object based on a product of the first similarity and a second preset weight coefficient and a product of the second similarity and a preset third weight coefficient. The second weight coefficient is associated with a modality corresponding to the feature vector of the retrieval object indicated by the third code. The third weight coefficient is associated with a modality corresponding to an index feature indicated by the fifth code.

A modality corresponding to the first similarity may be different from a modality corresponding to the second similarity in importance. Therefore, in this embodiment of this disclosure, the first similarity is multiplied by the corresponding second weight coefficient, and the second similarity is multiplied by the corresponding third weight coefficient. This can ensure that the calculated correlation between the second group of object information and the retrieval object is more accurate. The second weight coefficient and the third weight coefficient may be the same, or may be different.

Finally, the correlation between the second group of object information and the retrieval object is determined based on the product (denoted as a first product) of the first similarity and the third preset weight coefficient and the product (denoted as a second product) of the second similarity and the preset third weight coefficient. In an implementation, in the case 3 or case 4, a sum of the first product and the second product may be used as the correlation between the second group of object information and the retrieval object.

To better understand the method in embodiments of this disclosure, the following describes procedures of an index construction method and a retrieval method in some implementations.

The index construction method includes the following steps.

Step 1: Combine a plurality of feature vectors with a same element type in M feature vectors of each group of object information in the plurality of groups of object information into one feature vector of the object information, to convert the M feature vectors of the object information into N feature vectors.

It should be noted that step 1 may be understood with reference to the foregoing related description of step 201.

Step 2: If an element type of each of the N feature vectors of the object information is an enumeration type or a Boolean type, an element value of the feature vector is used as a code of the feature vector.

It should be noted that step 2 may be understood with reference to related descriptions of the method for obtaining the second code in the foregoing embodiment.

Step 3: If an element type of each of the N feature vectors of the object information is a numeric type, the feature vector of the object information is encoded according to the PQ algorithm.

It should be noted that step 2 may be understood with reference to related descriptions of the method for obtaining the fourth code in the foregoing embodiment.

Step 4: Construct an index based on codes of the N feature vectors separately corresponding to the plurality of groups of object information.

It should be noted that step 1 may be understood with reference to the foregoing related description of step 102. For example, the index may be constructed based on a Cartesian product of the codes of the N feature vectors that is obtained by multiplying a weight coefficient.

The retrieval method includes the following steps.

Step 1: Combine a plurality of feature vectors with a same element type in M feature vectors of the retrieval object into one feature vector, to convert the M feature vectors of the retrieval object into N feature vectors.

It should be noted that step 1 may be understood with reference to the foregoing related description of step 501.

Step 2: If an element type of each of the N feature vectors of the retrieval object is an enumeration type or a Boolean type, an element value of the feature vector is used as a code of the feature vector.

It should be noted that step 2 may be understood with reference to related descriptions of the method for obtaining the first code in the foregoing embodiment.

Step 3: If an element type of each of the N feature vectors of the retrieval object is a numeric type, the feature vector of the retrieval object is encoded according to the PQ algorithm.

It should be noted that step 3 may be understood with reference to related descriptions of the method for obtaining the third code in the foregoing embodiment.

Next, retrieval is performed based on the codes of the N feature vectors of the retrieval object.

Step 4: Assuming that the N codes forming the first data include the first code, where an element type of a feature vector of the retrieval object indicated by the first code is an enumeration type or a Boolean type, and the N codes forming the second data include the second code, where the first code corresponds to the second code, if the first code is different from the second code corresponding to a first group of object information, the first group of object information is not included in the at least one group of retrieved object information, and the first group of object information belongs to the plurality of groups of object information.

It should be noted that step 4 may be understood with reference to related descriptions of the foregoing embodiment.

Step 5: If the first code is the same as the second code corresponding to the first group of object information, calculate a correlation between the first group of object information and the retrieval object based on another code different from the first code in the N codes forming the first data and another code different from the second code in the N codes forming the second data. The first group of object information belongs to the plurality of groups of object information.

It should be noted that step 5 may be understood with reference to related descriptions the foregoing embodiment.

Step 6: Assuming that the N codes forming the first data include the third code, where an element type of a feature vector of the retrieval object indicated by the third code is a numeric type, and the N codes forming the second data include the fourth code, where the fourth code corresponds to the third code, calculate the first similarity based on the third code and the fourth code.

It should be noted that step 6 may be understood with reference to related descriptions the foregoing embodiment.

Step 7: Assuming that the N codes forming the second data further include the sixth code, where the sixth code corresponds to the fifth code, calculate the second similarity based on the fifth code and the sixth code.

It should be noted that step 7 may be understood with reference to related descriptions the foregoing embodiment.

Step 8: Determine the correlation between the second group of object information and the retrieval object based on the first similarity and the second similarity.

It should be noted that step 8 may be understood with reference to related descriptions the foregoing embodiment.

Figure 12:
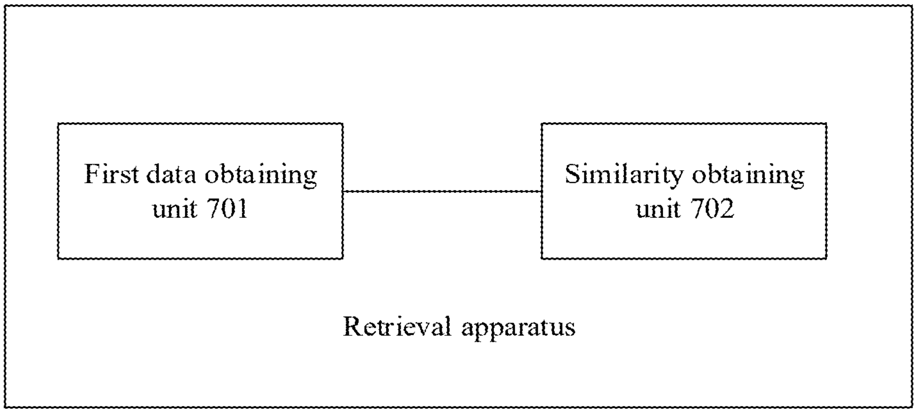
FIG. 12 is a schematic diagram of an embodiment of a retrieval apparatus according to an embodiment of this disclosure.

FIG. 12 is a schematic diagram of an embodiment of a retrieval apparatus according to an embodiment of this disclosure. An embodiment of this disclosure provides a retrieval apparatus, including the following two units.

A first data obtaining unit 701 is configured to obtain first data corresponding to a retrieval object. The first data indicates M feature vectors of the retrieval object. Each feature vector of the retrieval object corresponds to one modality of the retrieval object. M is an integer greater than 1.

A function of the first data obtaining unit 701 may be understood with reference to related descriptions of step 101 in the foregoing description.

A similarity obtaining unit 702 is configured to obtain a correlation between a plurality of groups of object information and the retrieval object based on the first data and a plurality of groups of second data in an index, to output at least one group of retrieved object information. A correlation between each group of object information in the at least one group of object information and the retrieval object is greater than a first threshold. Each group of object information in the index corresponds to M feature vectors. The M feature vectors corresponding to each group of object information are indicated by one group of second data. Each feature vector of the object information corresponds to one modality of the object information.

A function of the first data obtaining unit 702 may be understood with reference to related descriptions of step 102 in the foregoing description.

In another embodiment of the retrieval apparatus provided in embodiments of this disclosure, the first data includes N codes. Each code forming the first data indicates at least one feature vector of the retrieval object. N is a positive integer. The second data includes N codes, and each code forming the second data indicates at least one feature vector of the object information.

In another embodiment of the retrieval apparatus provided in embodiments of this disclosure, the N codes forming the first data are in a one-to-one correspondence with the N codes forming the second data. In two corresponding codes, a modality corresponding to a feature vector of the retrieval object indicated by one code is the same as a modality corresponding to a feature vector of the object information indicated by the other code.

In another embodiment of the retrieval apparatus provided in embodiments of this disclosure, the first data obtaining unit 701 is configured to separately encode the M feature vectors of the retrieval object to obtain M codes, to form the first data, where M is equal to N.

In another embodiment of the retrieval apparatus provided in embodiments of this disclosure, the first data obtaining unit 701 is configured to combine a plurality of feature vectors with a same element type in the M feature vectors of the retrieval object into one feature vector, to convert the M feature vectors of the retrieval object into N feature vectors, where N is less than M.

The N feature vectors of the retrieval object are separately encoded, to obtain the N codes, to form the first data.

A function of the first data obtaining unit 701 may be understood with reference to related descriptions of steps 201 and 202 in the foregoing description.

In another embodiment of the retrieval apparatus provided in embodiments of this disclosure, the first data obtaining unit 701 is configured to: normalize the plurality of feature vectors of the retrieval object whose element types are the same in the M feature vectors of the retrieval object; and combine, into one feature vector, the plurality of normalized feature vectors of the retrieval object whose element types are the same.

A function of the first data obtaining unit 701 may be understood with reference to related descriptions of steps 301 and 302 in the foregoing description.

In another embodiment of the retrieval apparatus provided in embodiments of this disclosure, the N codes forming the first data include a first code.

An element type of a feature vector of the retrieval object indicated by the first code is an enumeration type or a Boolean type. The first code is an element value of the feature vector of the retrieval object indicated by the first code.

In another embodiment of the retrieval apparatus provided in embodiments of this disclosure, the N codes forming the first data include a first code. An element type of a feature vector of the retrieval object indicated by the first code is an enumeration type or a Boolean type. The N codes forming the second data include the second code, where the second code corresponds to the first code. If the first code is different from the second code corresponding to a first group of object information, the first group of object information is not included in the at least one group of retrieved object information, and the first group of object information belongs to the plurality of groups of object information.

In another embodiment of the retrieval apparatus provided in embodiments of this disclosure, N is greater than 1. The N codes forming the first data include a first code. An element type of a feature vector of the retrieval object indicated by the first code is an enumeration type or a Boolean type.

The N codes forming the second data include the second code, where the second code corresponds to the first code.

The similarity obtaining unit 702 is configured to: when the first code is the same as the second code corresponding to the first group of object information, calculate a correlation between the first group of object information and the retrieval object based on another code different from the first code in the N codes forming the first data and another code different from the second code in the N codes forming the second data. The first group of object information belongs to the plurality of groups of object information.

In another embodiment of the retrieval apparatus provided in embodiments of this disclosure, the N codes forming the first data include a third code. An element type of a feature vector of the retrieval object indicated by the third code is a numeric type.

The N codes forming the second data include a fourth code, where the fourth code corresponds to the third code.

The similarity obtaining unit 702 is configured to: calculate a first similarity between the feature vector of the retrieval object indicated by the third code and a feature vector of object information indicated by the fourth code based on the third code and the fourth code. A second group of object information is one of the plurality of groups of object information.

In another embodiment of the retrieval apparatus provided in embodiments of this disclosure, the feature vector of the object information indicated by the fourth code includes X second sub-vectors. The fourth code includes each second sub-code of the X second sub-vectors. Each second sub-code corresponds to one codebook. The index further includes a codebook corresponding to the feature vector of the object information indicated by the fourth code. The codebook corresponding to the feature vector of the object information indicated by the fourth code includes each codebook of the X second sub-codes. The feature vector of the retrieval object indicated by the third code includes X first sub-vectors. The third code includes each first sub-code of the X first sub-vectors. The X first sub-codes are in a one-to-one correspondence with the codebooks of the X second sub-codes.

The similarity obtaining unit 702 is configured to: calculate the first similarity based on the X first sub-codes, the X second sub-codes, and the codebooks of the X second sub-codes.

In another embodiment of the retrieval apparatus provided in embodiments of this disclosure, the first similarity may be a distance between the feature vector of the retrieval object indicated by the third code and the feature vector of object information indicated by the fourth code, and may be a Euclidean distance, a Manhattan distance, a Chebyshev distance, a Minkowski distance, a Hamming distance, and a cosine distance.

In another embodiment of the retrieval apparatus provided in embodiments of this disclosure, the N codes forming the first data further include a fifth code, where an element type of a feature vector of the retrieval object indicated by the fifth code is a numeric type. The N codes forming the second data further include a sixth code, where the sixth code corresponds to the fifth code.

The similarity obtaining unit 702 is configured to: calculate a second similarity between the feature vector of the retrieval object indicated by the fifth code and a feature vector of object information indicated by the sixth code based on the fifth code and the sixth code; and determine the correlation between the second group of object information and the retrieval object based on the first similarity and the second similarity.

In another embodiment of the retrieval apparatus provided in embodiments of this disclosure, the similarity obtaining unit 702 is configured to: determine the correlation between the second group of object information and the retrieval object based on a product of the first similarity and a preset second weight coefficient and a product of the second similarity and a third preset weight coefficient. The second weight coefficient is associated with a modality corresponding to the feature vector of the retrieval object indicated by the third code. The third weight coefficient is associated with a modality corresponding to the feature vector of the object information indicated by the fifth code.

In another embodiment of the retrieval apparatus provided in embodiments of this disclosure, the retrieval object is retrieved content. A carrier of the content includes one or more of the following: a picture, audio, a video, data, and a text. The retrieved content indicates one or more of information about a person, information about an animal, information about an article, information about a plant, information about a location, information about a landscape, and information about a building.

In another embodiment of the retrieval apparatus provided in embodiments of this disclosure, the object information indicates one or more feature categories of at least one of the following objects: a person, an animal, an article, a plant, a landscape, and a building.

Figure 13:
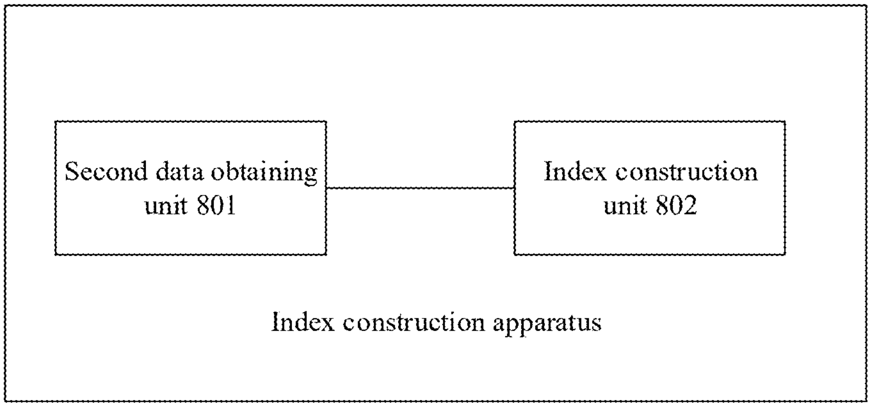
FIG. 13 is a schematic diagram of an embodiment of an index construction apparatus according to an embodiment of this disclosure.

FIG. 13 is a schematic diagram of an embodiment of an index construction apparatus according to an embodiment of this disclosure. As shown in FIG. 13, an embodiment of this disclosure provides the index construction apparatus, including the following two units.

A second data obtaining unit 801 is configured to obtain one group of second data separately corresponding to a plurality of groups of object information. Each group of object information corresponds to M feature vectors. The M feature vectors of each group of object information are indicated by one group of second data. Each feature vector of the object information corresponds to one modality of the object information. M is an integer greater than 1.

A function of the second data obtaining unit 801 may be understood with reference to related descriptions of step 401 in the foregoing description.

An index construction unit 802 is configured to construct an index based on the group of second data separately corresponding to the plurality of groups of object information. The index includes a correspondence between the object information and the second data.

A function of the index construction unit 802 may be understood with reference to related descriptions of step 402 in the foregoing description.

In another embodiment of the index construction apparatus provided in embodiments of this disclosure, the second data includes N codes. Each code forming the second data indicates at least one feature vector of the object information. N is a positive integer.

In another embodiment of the index construction apparatus provided in embodiments of this disclosure, the second data obtaining unit 801 is configured to: combine a plurality of feature vectors with a same element type in the M feature vectors of each group of object information into one feature vector, to convert the M feature vectors of the object information into N feature vectors of the object information, where N is less than M; and separately encode the N feature vectors of the object information to obtain N codes, to form the second data.

A function of the second data obtaining unit 801 may be understood with reference to related descriptions of steps 501 and 502 in the foregoing description.

In another embodiment of the index construction apparatus provided in embodiments of this disclosure, the second data obtaining unit 801 is configured to: normalize the plurality of feature vectors with the same element type in the M feature vectors of the object information; and combine, into one feature vector of the object information, the plurality of normalized feature vectors of the object information whose element types are the same.

A function of the second data obtaining unit 801 may be understood with reference to related descriptions of steps 601 and 602 in the foregoing description.

In another embodiment of the index construction apparatus provided in embodiments of this disclosure, N codes forming the second data include a second code.

An element type of a feature vector of the object information indicated by the second code is an enumeration type or a Boolean type. The second code is an element value of the feature vector of the object information indicated by the second code.

In another embodiment of the index construction apparatus provided in embodiments of this disclosure, the feature vector of the object information indicated by the fourth code includes X second sub-vectors. The fourth code includes each second sub-code of the X second sub-vectors. Each second sub-code corresponds to one codebook.

The index further includes a codebook corresponding to the feature vector of the object information indicated by the fourth code. The codebook corresponding to the feature vector of the object information indicated by the fourth code includes each codebook of the X second sub-codes.

Figure 14:
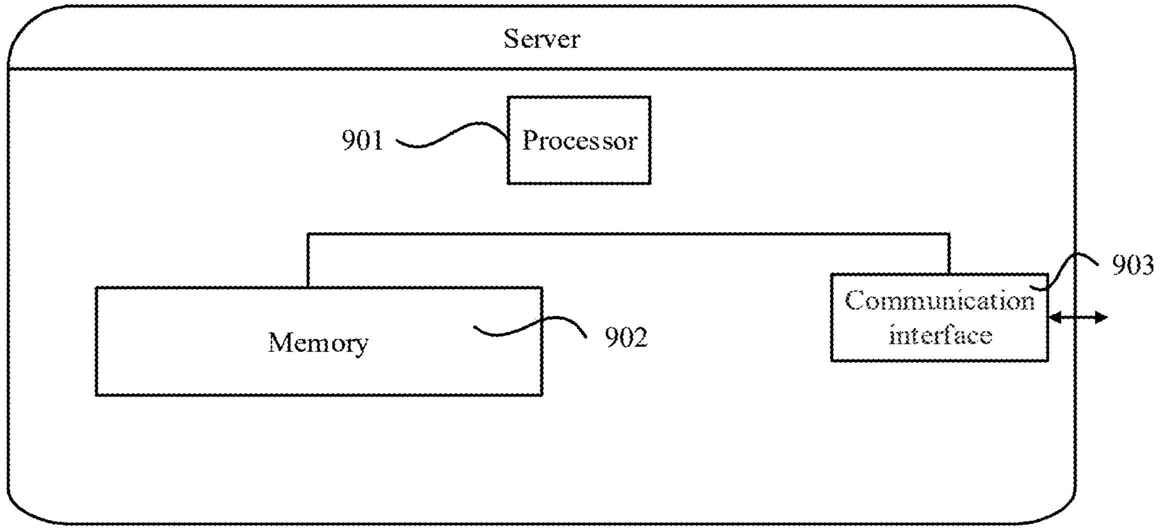
FIG. 14 is a schematic diagram of a structure of a server according to an embodiment of this disclosure.

FIG. 14 is a schematic diagram of a structure of a server according to an embodiment of this disclosure.

An embodiment of the server in embodiments of this disclosure may include one or more processors 901, a memory 902, and a communication interface 903.

The memory 902 may be used for temporary storage or permanent storage. Further, the processor 901 may be configured to communicate with the memory 902, and perform, on a control device, a series of instruction operations in the memory 902.

In this embodiment, the processor 901 may perform the steps of the method in the embodiments shown in FIG. 4, FIG. 6A, FIG. 7, FIG. 8, FIG. 10, or FIG. 11. Details are not described herein again.

For example, the processor 901 may perform the following steps: obtain one group of second data separately corresponding to a plurality of groups of object information, where each group of object information corresponds to M feature vectors, the M feature vectors of each group of object information are indicated by one group of second data, each feature vector of the object information corresponds to one modality of the object information, and M is an integer greater than 1; and construct an index based on the group of second data separately corresponding to the plurality of groups of object information, where the index includes a correspondence between the object information and the second data.

There may be a plurality of types of the second data, for example, may be a code, a text, or a symbol. A method for obtaining the second data may be related to the type of the second data. Therefore, different types of second data correspond to different obtaining methods. There are also a plurality of index construction methods based on the second data. Correspondingly, there may be a plurality of data structures of the index.

For example, the processor 901 may perform the following step: obtain first data corresponding to a retrieval object, where the first data indicates M feature vectors of the retrieval object, each feature vector of the retrieval object corresponds to one modality of the retrieval object, and M is an integer greater than 1. There may be a plurality of types of the first data, for example, may be a code, a text, or a symbol. A method for obtaining the first data may be related to the type of the first data.

The method further includes: obtaining a correlation between a plurality of groups of object information and the retrieval object based on the first data and a plurality of groups of second data in an index, to output at least one group of retrieved object information. A correlation between each group of object information in the at least one group of object information and the retrieval object is greater than a first threshold. Each group of object information in the index corresponds to M feature vectors. The M feature vectors corresponding to each group of object information are indicated by one group of second data. Each feature vector of the object information corresponds to one modality of the object information. The correlation may be indicated by using a plurality of methods. For example, the correlation may be indicated by a distance between vectors, or may be indicated by using a score.

In this embodiment of this disclosure, specific division of function modules in the processor 901 may be similar to division of function modules such as the first data obtaining unit and the similarity obtaining unit described in FIG. 12, or may be similar to division of function modules such as the second data obtaining unit and the index construction unit described in FIG. 13. Details are not described herein again.

An embodiment of this disclosure further provides a chip or a chip system. The chip or the chip system includes at least one processor and a communication interface, the communication interface and the at least one processor are interconnected through a line, and the at least one processor is configured to run computer programs or instructions, to perform the steps of the method in the embodiments shown in FIG. 4, FIG. 6A, or FIG. 7. Details are not described herein again.

The communication interface in the chip may be an input/output interface, a pin, a circuit, or the like.

An embodiment of this disclosure further provides a first implementation of a chip or a chip system. The chip or the chip system described above in this disclosure further includes at least one memory. The at least one memory stores instructions. The memory may be a storage unit inside the chip, for example, a register or a cache, or may be a storage unit (for example, a read-only memory (ROM) or a random-access memory (RAM)) of the chip.

An embodiment of this disclosure further provides a chip or a chip system. The chip or the chip system includes at least one processor and a communication interface, the communication interface and the at least one processor are interconnected through a line, and the at least one processor is configured to run computer programs or instructions, to perform the steps of the method in the embodiments shown in FIG. 8, FIG. 10, or FIG. 11. Details are not described herein again.

The communication interface in the chip may be an input/output interface, a pin, a circuit, or the like.

An embodiment of this disclosure further provides a first implementation of a chip or a chip system. The chip or the chip system described above in this disclosure further includes at least one memory. The at least one memory stores instructions. The memory may be a storage unit inside the chip, for example, a register or a cache, or may be a storage unit (for example, a ROM or a RAM) of the chip.

An embodiment of this disclosure further provides a computer storage medium, where the computer storage medium is configured to store computer software instructions used by the foregoing control device, and the computer software instructions include a program designed for executing the server.

The server may be the retrieval apparatus described in FIG. 11 or the index construction apparatus described in FIG. 13.

An embodiment of this disclosure further provides a computer program product, where the computer program product includes computer software instructions, and the computer software instructions may be loaded by a processor to implement procedures in the methods in FIG. 4, FIG. 6A, FIG. 7, FIG. 8, FIG. 9, and FIG. 11.

Figure 15:
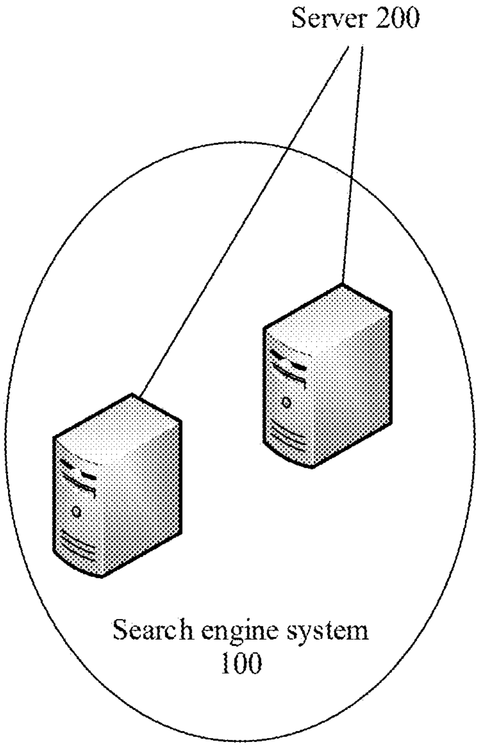
FIG. 15 is a schematic diagram of a structure of a search engine system according to an embodiment of this disclosure.

FIG. 15 is a schematic diagram of a structure of a search engine system according to an embodiment of this disclosure.

An embodiment of this disclosure further provides an embodiment of a search engine system 200, including: one or more servers 100. FIG. 15 shows two servers 100.

The server 100 is configured to perform the steps of the method in the embodiments shown in FIG. 4, FIG. 6A, FIG. 7, FIG. 8, FIG. 10, and FIG. 11.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed systems, apparatuses, and methods may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or other forms.

The units described as separate parts may or may not be physically separate. Parts displayed as units may or may not be physical units, and may be located in one position or may be distributed on a plurality of network units. Some or all of the units may be selected based on actual requirements to achieve the objectives of the solutions in embodiments.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this disclosure essentially, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this disclosure. The storage medium includes any medium that can store program code, such as a Universal Serial Bus (USB) flash drive, a removable hard disk, a ROM, a RAM, a magnetic disk, or an optical disc.

What is claimed is:

1. A retrieval method, comprising:

obtaining first data corresponding to a retrieval object, wherein the first data comprises N first codes, wherein N is a positive integer, wherein the first data indicates M first feature vectors of the retrieval object, wherein each of the N first codes indicates at least one of the M first feature vectors, wherein the N first codes comprise a first code, wherein an element type of the at least one of the M first feature vectors indicated by the first code is an enumeration type or a Boolean type, wherein each of the M first feature vectors comprises a numerical vector representation and corresponds to one first modality of the retrieval object, and wherein Mis an integer greater than 1;

obtaining, based on the first data and a first plurality of groups of second data in an index, a first correlation between a second plurality of groups of object information and the retrieval object, wherein each group of the second data comprises N second codes, wherein the N second codes comprise a second code, wherein the second code corresponds to the first code, wherein obtaining the first correlation comprises calculating, based on a third code different from the first code in the N first codes and a fourth code different from the second code in the N second codes, a third correlation between a first group of object information and the retrieval object when the first code is the same as the second code, and wherein the first group of object information belongs to the second plurality of groups of object information; and outputting, based on the first correlation, at least one group of retrieved object information, wherein a second correlation between each of the second plurality of groups and the retrieval object is greater than a first threshold, wherein each of the first plurality of groups corresponds to M second feature vectors, wherein each of the N second codes indicates at least one of the M second feature vectors, wherein the M second feature vectors are indicated by one of the first plurality of groups, and wherein each of the M second feature vectors corresponds to one second modality of the object information of a respective one of the second plurality of groups.

2. The retrieval method of claim 1, wherein the N first codes are in a one-to-one correspondence with the N second codes, and wherein in two corresponding codes, the first modality corresponding to one of the M first feature vectors is the same as the second modality corresponding to one of the M second feature vectors.

3. The retrieval method of claim 1, wherein obtaining the first data corresponding to the retrieval object comprises:

combining a plurality of the M first feature vectors with a same element type into one feature vector to convert the M first feature vectors into N feature vectors, wherein N is less than M; and separately encoding the N feature vectors to obtain the first data.

4. The retrieval method of claim 1, wherein the first code is an element value of the at least one of the M first feature vectors indicated by the first code.

5. The retrieval method of claim 1, wherein when the first code is different from the second code and the second code corresponds to a first group of object information, the first group of object information is not comprised in the at least one group of retrieved object information and the first group of object information belongs to the second plurality of groups of object information.

6. The retrieval method of claim 1, wherein the N first codes comprise a fifth code, wherein an element type of a first one of the M first feature vectors indicated by the fifth code is a numeric type, wherein the N second codes comprise a sixth code, wherein the sixth code corresponds to the fifth code, wherein obtaining, based on the first data and the first plurality of groups of second data in the index, the first correlation between the second plurality of groups of object information and the retrieval object comprises calculating, based on the fifth code and the sixth code, a first similarity, wherein the first similarity is between the first one of the M first feature vectors and one of the M second feature vectors indicated by the sixth code, and wherein a second group of object information is one of the second plurality of groups of object information.

7. The retrieval method of claim 6, wherein the one of the M second feature vectors comprises X second sub-vectors, wherein the sixth code comprises X second sub-codes of the X second sub-vectors, wherein each of the X second sub-codes corresponds to one codebook, wherein X is a positive integer, wherein the index further comprises a first codebook corresponding to the one of the M second feature vectors, wherein the first codebook comprises each codebook of the X second sub-codes, wherein the one of the M first feature vectors comprises X first sub-vectors, wherein the fifth code comprises X first sub-codes of the X first sub-vectors, wherein the X first sub-codes are in a one-to-one correspondence with the codebooks of the X second sub-codes, and wherein calculating, based on the fifth code and the sixth code, the first similarity comprises calculating, based on the X first sub-codes, the X second sub-codes, and the codebooks of the X second sub-codes, the first similarity.

8. The retrieval method of claim 6, wherein the N first codes further comprise a seventh code, wherein a second element type of a second one of the M first feature vectors indicated by the seventh code is the numeric type, wherein the N second codes further comprise an eighth code, wherein the eighth code corresponds to the seventh code, and wherein obtaining, based on the first data and the first plurality of groups of second data in the index, the first correlation between the second plurality of groups of object information and the retrieval object comprises:

calculating, based on the seventh code and the eighth code, a second similarity, wherein the second similarity is between the second one of the M first feature vectors and one of the at least one of the M second feature vectors; and determining, based on the first similarity and the second similarity, a fourth correlation between the second group of object information and the retrieval object.

9. The retrieval method of claim 8, wherein determining, based on the first similarity and the second similarity, the fourth correlation between the second group of object information and the retrieval object comprises determining, based on a first product of the first similarity and a first weight coefficient and based on a second product of the second similarity and a second weight coefficient, the fourth correlation, wherein the first weight coefficient is associated with a third modality corresponding to the first one of the M first feature vectors, and wherein the second weight coefficient is associated with a fourth modality corresponding to the second one of the M first feature vectors.

10. The retrieval method of claim 1, wherein the retrieval object is retrieved content, wherein a carrier of the retrieved content comprises one or more of a picture, audio, a video, data, or a text, and wherein the retrieved content indicates one or more of first information about a person, second information about an animal, third information about an article, fourth information about a plant, fifth information about a location, sixth information about a landscape, or seventh information about a building.

11. The retrieval method of claim 1, wherein the object information indicates one or more feature categories of at least one of a person, an animal, an article, a plant, a landscape, or a building.

12. A retrieval apparatus, comprising:

a memory configured to store instructions; and a processor coupled to the memory and configured to execute the instructions to:

obtain first data corresponding to a retrieval object, wherein the first data comprises N first codes, wherein N is a positive integer, wherein the first data indicates M first feature vectors of the retrieval object, wherein each of the N first codes indicates at least one of the M first feature vectors, wherein the N first codes comprise a first code, wherein an element type of the at least one of the M first feature vectors indicated by the first code is an enumeration type or a Boolean type, wherein each of the M first feature vectors comprises a numerical vector representation and corresponds to one first modality of the retrieval object, and wherein Mis an integer greater than 1;

obtain, based on the first data and a first plurality of groups of second data in an index, a first correlation between a second plurality of groups of object information and the retrieval object, wherein each group of the second data comprises N second codes, wherein the N second codes comprise a second code, wherein the second code corresponds to the first code, wherein obtaining the first correlation comprises calculating, based on a third code different from the first code in the N first codes and a fourth code different from the second code in the N second codes, a third correlation between a first group of object information and the retrieval object when the first code is the same as the second code, and wherein the first group of object information belongs to the second plurality of groups of object information; and output, based on the first correlation, at least one group of retrieved object information, wherein a second correlation between each of the second plurality of groups and the retrieval object is greater than a first threshold, wherein each of the first plurality of groups corresponds to M second feature vectors, wherein each of the N second codes indicates at least one of the M second feature vectors, wherein the M second feature vectors are indicated by one of the first plurality of groups, and wherein each of the M second feature vectors corresponds to one second modality of the object information of a respective one of the second plurality of groups.

13. The retrieval apparatus of claim 12, wherein the N first codes are in a one-to-one correspondence with the N second codes, and wherein in two corresponding codes, the first modality corresponding to one of the M first feature vectors is the same as the second modality corresponding to one of the M second feature vectors.

14. The retrieval apparatus of claim 12, wherein the processor is further configured to execute the instructions to:

combine a plurality of the M first feature vectors with a same element type into one feature vector to convert the M first feature vectors into N feature vectors, wherein N is less than M; and separately encode the N feature vectors to obtain the first data.

15. The retrieval apparatus of claim 12, wherein the first code is an element value of the at least one of the M first feature vectors indicated by the first code.

16. A computer program product comprising instructions stored on a non-transitory computer-readable medium that, when executed by a processor, cause a retrieval apparatus to:

obtain first data corresponding to a retrieval object, wherein the first data comprises N first codes, wherein N is a positive integer, wherein the first data indicates M first feature vectors of the retrieval object, wherein each of the N first codes indicates at least one of the M first feature vectors, wherein the N first codes comprise a first code, wherein an element type of the at least one of the M first feature vectors indicated by the first code is an enumeration type or a Boolean type, wherein each of the M first feature vectors comprises a numerical vector representation and corresponds to one first modality of the retrieval object, and wherein Mis an integer greater than 1;

obtain, based on the first data and a first plurality of groups of second data in an index, a first correlation between a second plurality of groups of object information and the retrieval object, wherein each group of the second data comprises N second codes, wherein the N second codes comprise a second code, wherein the second code corresponds to the first code, wherein obtaining the first correlation comprises calculating, based on a third code different from the first code in the N first codes and a fourth code different from the second code in the N second codes, a third correlation between a first group of object information and the retrieval object when the first code is the same as the second code, and wherein the first group of object information belongs to the second plurality of groups of object information; and output, based on the first correlation, at least one group of retrieved object information, wherein a second correlation between each of the second plurality of groups and the retrieval object is greater than a first threshold, wherein each of the first plurality of groups corresponds to M second feature vectors, wherein each of the N second codes indicates at least one of the M second feature vectors, wherein the M second feature vectors are indicated by one of the first plurality of groups, and wherein each of the M second feature vectors corresponds to one second modality of the object information of a respective one of the second plurality of groups.

17. The computer program product of claim 16, wherein the N first codes are in a one-to-one correspondence with the N second codes, and wherein in two corresponding codes, the first modality corresponding to one of the M first feature vectors is the same as the second modality corresponding to one of the M second feature vectors.

18. The computer program product of claim 16, wherein the first code is an element value of the at least one of the M first feature vectors indicated by the first code.

19. The computer program product of claim 16, wherein when the first code is different from the second code and the second code corresponds to a first group of object information, the first group of object information is not comprised in the at least one group of retrieved object information and the first group of object information belongs to the second plurality of groups of object information.

20. The computer program product of claim 16, wherein the object information indicates one or more feature categories of at least one of a person, an animal, an article, a plant, a landscape, or a building.

* * * * *